US012039359B1

United States Patent
Zebchuk et al.

(10) Patent No.: US 12,039,359 B1
(45) Date of Patent: *Jul. 16, 2024

(54) SYSTEM AND METHOD FOR ISOLATING WORK WITHIN A VIRTUALIZED SCHEDULER USING TAG-SPACES

(71) Applicant: Marvell Asia Pte, Ltd., Singapore (SG)

(72) Inventors: Jason D. Zebchuk, Watertown, MA (US); Wilson P. Snyder, II, Holliston, MA (US); Steven W. Aiken, Pepperell, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,861

(22) Filed: Jun. 29, 2022

Related U.S. Application Data

(63) Continuation of application No. 16/584,584, filed on Sep. 26, 2019, now Pat. No. 11,409,553.

(51) Int. Cl.
*G06F 9/455* (2018.01)
*G06F 9/38* (2018.01)
*G06F 9/48* (2006.01)

(52) U.S. Cl.
CPC ........ *G06F 9/45558* (2013.01); *G06F 9/3856* (2023.08); *G06F 9/4881* (2013.01);
(Continued)

(58) Field of Classification Search
CPC .. G06F 9/45558; G06F 9/3856; G06F 9/4881; G06F 2009/4557; G06F 2009/45587; G06F 2009/45595
See application file for complete search history.

(56) References Cited

U.S. PATENT DOCUMENTS 6,401,147 B1  6/2002 Sang et al.
6,748,593 B1  6/2004 Brenner et al.
(Continued)

OTHER PUBLICATIONS

Microsoft Docs, "Overview of Single Root 1/0 Virtualization (SR-IOV)," Apr. 19, 2017.
(Continued)

*Primary Examiner* — Kenneth Tang
(74) *Attorney, Agent, or Firm* — Hamilton, Brook, Smith & Reynolds, P.C.

(57) ABSTRACT

A system and corresponding method isolate work within a virtualized scheduler using tag-spaces. The system comprises a tag-space resource configured to store at least one respective assignment of at least one scheduling group to a given tag-space. The given tag-space defines a given ordering-atomicity domain that isolates, within the virtualized scheduler, (i) work belonging to the at least one scheduling group from (ii) work belonging to at least one other scheduling group, assigned, in the tag-space resource, to a respective tag-space different from the given tag-space. The system further comprises a work scheduler that schedules, for processing, work belonging to the at least one scheduling group and work belonging to the at least one other scheduling group. Such scheduling may have independent ordering and atomicity effectuated therebetween by the given ordering-atomicity domain. Such independency of ordering and atomicity improves quality-of-service of the virtualized scheduler.

54 Claims, 8 Drawing Sheets

(52) U.S. Cl.
CPC ............... *G06F 2009/4557* (2013.01); *G06F 2009/45587* (2013.01); *G06F 2009/45595* (2013.01)

(56) References Cited

U.S. PATENT DOCUMENTS

| | | |
|---|---|---|
| 7,110,359 B1 | 9/2006 | Acharya |
| 7,500,241 B1 | 3/2009 | Flockhart et al. |
| 7,535,907 B2 | 5/2009 | Hussain et al. |
| 7,860,930 B2 | 12/2010 | Freimuth et al. |
| 7,895,431 B2 | 2/2011 | Bouchard et al. |
| 8,214,835 B2 | 7/2012 | Tsai et al. |
| 8,239,655 B2 | 8/2012 | Goggin et al. |
| 8,543,754 B2 | 9/2013 | Glass et al. |
| 8,850,446 B2 | 9/2014 | Avni et al. |
| 8,869,165 B2 | 10/2014 | Dasgupta et al. |
| 8,959,249 B1 | 2/2015 | Love |
| 9,059,945 B2 | 6/2015 | Kravitz et al. |
| 9,450,885 B2 | 9/2016 | Johnsen et al. |
| 9,798,682 B2 | 10/2017 | Walker et al. |
| 9,838,471 B2 | 12/2017 | Snyder, II et al. |
| 10,198,288 B2 | 2/2019 | Tasoulas et al. |
| 10,223,159 B2 | 3/2019 | Kaplan et al. |
| 10,445,271 B2 | 10/2019 | Wang et al. |
| 10,565,024 B2 | 2/2020 | Dice et al. |
| 10,884,797 B2 | 1/2021 | Nield et al. |
| 10,990,440 B2 | 4/2021 | Botelho |
| 11,061,724 B2 | 7/2021 | Nakada et al. |
| 11,150,944 B2 | 10/2021 | Burke et al. |
| 11,178,023 B2 | 11/2021 | Sarangam et al. |
| 11,237,864 B2 | 2/2022 | Botelho |
| 11,263,158 B2 | 3/2022 | Galles et al. |
| 11,294,715 B2 | 4/2022 | Zebchuk et al. |
| 11,409,553 B1 * | 8/2022 | Zebchuk ............... G06F 9/3856 |
| 11,635,987 B2 | 4/2023 | Zebchuk et al. |
| 2004/0221290 A1 | 11/2004 | Casey et al. |
| 2006/0056406 A1 * | 3/2006 | Bouchard ............... H04L 12/56 370/389 |
| 2007/0277152 A1 | 11/2007 | Srinivasan |
| 2009/0083517 A1 | 3/2009 | Riddle |
| 2009/0320032 A1 | 12/2009 | Avni et al. |
| 2011/0225583 A1 | 9/2011 | Suh et al. |
| 2013/0070760 A1 | 3/2013 | Shah et al. |
| 2014/0115591 A1 | 4/2014 | Chen |
| 2014/0331001 A1 | 11/2014 | Liu et al. |
| 2015/0220360 A1 * | 8/2015 | Snyder, II ........... G06F 12/0811 718/105 |
| 2015/0220872 A1 * | 8/2015 | Snyder, II ...... G06Q 10/063114 705/7.15 |
| 2015/0254104 A1 * | 9/2015 | Kessler ................. G06F 9/5016 711/170 |
| 2016/0283283 A1 | 9/2016 | Jung |
| 2017/0005813 A1 * | 1/2017 | Sobh ..................... H04M 17/02 |
| 2017/0024128 A1 * | 1/2017 | Beale .................... G06F 3/0647 |
| 2018/0253331 A1 | 9/2018 | Sato et al. |
| 2019/0005576 A1 | 1/2019 | Mick et al. |
| 2019/0042463 A1 | 2/2019 | Shanbhogue et al. |
| 2019/0243683 A1 | 8/2019 | Botelho |
| 2019/0317802 A1 | 10/2019 | Bachmutsky et al. |
| 2020/0099670 A1 * | 3/2020 | Kessler ................. G06F 9/4881 |
| 2020/0104225 A1 * | 4/2020 | Erickson ................ G06F 9/451 |
| 2020/0125770 A1 * | 4/2020 | LeMay ..................... G06F 9/48 |
| 2020/0150993 A1 | 5/2020 | Krakirian et al. |
| 2020/0401440 A1 * | 12/2020 | Sankaran ................ G06F 9/383 |
| 2021/0064421 A1 | 3/2021 | Zebchuk et al. |
| 2022/0179690 A1 | 6/2022 | Zebchuk et al. |
| 2023/0221990 A1 | 7/2023 | Zebchuk et al. |

OTHER PUBLICATIONS

Venkatasubramanian et al., "TMT—A TLB Tag Management Framework for Virtualized Platforms", 2009, IEEE, pp. 153-160. (Year: 2009).

\* cited by examiner

SYSTEM AND METHOD FOR ISOLATING WORK WITHIN A VIRTUALIZED SCHEDULER USING TAG-SPACES

RELATED APPLICATION

This application is a continuation of U.S. application Ser. No. 16/584,584, filed Sep. 26, 2019, now U.S. Pat. No. 11,409,553, issued on Aug. 9, 2022. The entire teachings of the above application are incorporated herein by reference.

BACKGROUND

Peripheral component interconnect (PCI) express, also known as "PCIe," is a high-speed hardware interface for connecting to peripheral devices, such as a network interface controller (NIC) or another device. A single root I/O virtualization (SR-IOV) interface is an extension to the PCIe specification. SR-IOV allows a device, such as the NIC or other device, to separate access to its resources among various PCIe hardware functions, namely, a PCIe physical function (PF) and one or more PCIe virtual functions (VFs). A PF is the primary function of the device and advertises the device's SR-IOV capabilities. The PF is associated with a parent partition of a hypervisor in a virtualized environment.

The virtualized environment enables creation of multiple simulated environments with dedicated resources from a single, physical hardware system. The hypervisor is software that enables hardware resources of the physical hardware system to be separated into distinct and secure environments known as virtual machines (VMs). A virtual machine (VM) relies on the hypervisor's ability to separate the physical resources and distribute them appropriately. Each virtual function (VF) is associated with the device's PF. A given VF shares one or more physical resources of the device, such as memory, network port(s), etc., with the PF and other VFs on the device. Each VF is associated with a child partition of the hypervisor in the virtualized environment.

SR-IOV enables network traffic to bypass a software switch layer of a virtualization stack of the hypervisor. Because a VF is assigned to a child partition, network traffic may flow directly between the VF and child partition. As a result, an input/output (I/O) overhead in a software emulation layer is diminished and achieves network performance that is nearly the same performance as in a non-virtualized environment. For example, an operating system (OS) may have access to multiple VFs, e.g., for a NIC. To improve performance, the OS may delegate ownership of a VF to a user-space application, and allow that application to directly interact with physical hardware resources through that VF. In this case, the application performance can be much higher, since the application can interact directly with the hardware without the overhead of communication through the OS. SR-IOV allows the OS to delegate partial access to the hardware to an application while the rest of the hardware can be accessed directly by the OS, and/or be delegated to other applications.

A scheduler that supports scheduling of work to a VM, application, PF, or VF within the virtualized environment, supports hardware virtualization, and may be referred to as a "virtualized" scheduler. The work that is scheduled may include, for example, a packet processing operation(s) to be performed on a packet or a portion thereof. The packet may have been received, for example, from the NIC or other device via a hardware interface, such as a PCIe hardware interface, or any other hardware interface.

SUMMARY

According to an example embodiment, a system for isolating work within a virtualized scheduler uses tag-spaces. The system comprises a tag-space resource configured to store at least one respective assignment of at least one scheduling group to a given tag-space. The given tag-space defines an ordering-atomicity domain for isolating, within the virtualized scheduler, (i) work belonging to the at least one scheduling group from (ii) work belonging to at least one other scheduling group, assigned, in the tag-space resource to a respective tag-space different from the given tag-space. The system further comprises a work scheduler. The work scheduler is configured to schedule, for processing, work belonging to the at least one scheduling group and work belonging to the at least one other scheduling group.

The work scheduler may be further configured to schedule, for processing, the work belonging to the at least one scheduling group and work belonging to the at least one other scheduling group with independent ordering and atomicity effectuated therebetween by the ordering-atomicity domain.

The given ordering-atomicity domain includes all work belonging to each scheduling group of the at least one scheduling group assigned to the given tag-space. The given ordering-atomicity domain excludes all work belonging to all scheduling groups that are not assigned to the given tag-space.

The respective tag-space defines a respective ordering-atomicity domain different from the given ordering-atomicity domain. The respective ordering-atomicity domain includes all work belonging to each scheduling group of the at least one other scheduling group assigned to the respective tag-space. The respective ordering-atomicity domain excludes all work belonging to all scheduling groups that are not assigned to the respective tag-space.

In an event the given and respective ordering-atomicity domains include respective work associated with a same tag value, the work scheduler is enabled to schedule for processing, in parallel, by respective work processing entities, the respective work from the given ordering-atomicity domain and the respective work from the respective ordering-atomicity domain, irrespective of a respective tag value or tag-type value associated therewith.

The at least one scheduling group may belong to a virtual machine, an application, or a physical function (PF) or virtual function (VF) associated with a single root I/O virtualization (SR-IOV) interface. The given tag-space may be concealed from the virtual machine, application, or PF or VF, to which the at least one scheduling group belongs. The at least one other scheduling group may belong to the virtual machine, application, or PF or VF to which the at least one scheduling group belongs. The respective tag-space may be concealed from the virtual machine, application, or PF or VF.

The at least one other scheduling group may belong to a different virtual machine, different application, or different PF or different VF, that is different from the virtual machine, application, or PF or VF to which the at least one scheduling group belongs. The respective tag-space may be concealed from the different virtual machine, different application, or different PF or different VF to which the at least one other scheduling group belongs.

The at least one scheduling group may be assigned to the given tag-space before work is added to the at least one scheduling group. In an event a given scheduling group, of the at least one scheduling group, has no work belonging thereto, the given scheduling group may be permitted to be reassigned from the given tag-space to another tag-space that is different from the given-tag space. In an event the given scheduling group has work belonging thereto, the given scheduling group may not be permitted to be reassigned from the given tag-space.

The system may further comprise an in-unit entry (IUE) resource with a plurality of in-unit entries (IUEs) for storing respective work queue entries (WQEs) for scheduling by the work scheduler. The system may further comprise an arbiter configured to select WQEs to move into the TUE resource. The system may further comprise a tag-space controller configured to obtain, from the tag-space resource, respective tag-spaces assigned to respective scheduling groups of the WQEs selected and to move the WQEs selected, in combination with the respective tag-spaces obtained, into the IUE resource.

The WQEs selected may include respective group identifiers (IDs) of the respective scheduling groups. The tag-space controller may be further configured to obtain the respective tag-spaces based on the respective group IDs.

The WQEs selected may include respective tag values. The tag-space controller may be further configured to concatenate the respective tag values with the respective tag-spaces obtained.

The work scheduler may be further configured to associate IUEs, of the plurality of IUEs, occupied by respective WQEs, associated with a same tag value, a same tag-type value, and a same tag-space value, to form a respective ordering chain used by the work scheduler to schedule the respective WQEs.

The work scheduler may be further configured to create a respective single ordering chain, associated with the given tag-space, for each unique pairing of a tag-type value and tag value found to be associated with work in the given ordering-atomicity domain. The respective single ordering chain created may include and order all work in the given ordering-atomicity domain that is associated with the unique pairing of the tag-type and tag values. In an event the tag-type value is un-ordered, the respective single ordering chain may not be created.

The work scheduler may be further configured to create a different respective single ordering chain for the unique pairing, in an event the unique pairing is found to be associated with work in the respective ordering-atomicity domain. The different respective single ordering chain created may be associated with the respective tag-space, different from the given tag-space, and may include and order all work in the respective ordering-atomicity domain that is associated with the unique pairing.

The work scheduler may be further configured to create a first ordering chain, associated with the given tag-space, for a given pairing of a tag-type value and tag value found to be associated with work in the given ordering-atomicity domain. In an event the given pairing is found to be associated with work in the respective ordering-atomicity domain, the work scheduler may be further configured to create a second ordering chain, associated with the respective tag-space, for the given pairing, and to schedule work from the first and second ordering chains without enforcing order or atomicity therebetween.

Work belonging to the given ordering-atomicity domain may include a plurality of WQEs associated with the given tag-space. The work scheduler may be further configured to order and enforce atomicity of WQEs, of the plurality of WQEs, irrespective of work outside the given ordering-atomicity domain.

The work scheduler may be further configured to order and enforce atomicity of WQEs, of the plurality of WQEs associated with the given-tag-space, selectively, based on respective tag-type values of the WQEs within the given ordering-atomicity domain. For example, according to an example embodiment, the work scheduler may be further configured to schedule WQEs, with a respective tag-type value of un-ordered, absent order or atomicity applied thereto.

To enforce atomicity, the work scheduler may be further configured to order, relative to one another, WQEs that (a) are associated with a respective tag-type value of atomic and a same respective tag value and (b) are from the plurality of WQEs associated with the given-tag-space, and to permit only a single work queue entry (WQE), from the WQEs ordered, to be processed at any time. The single WQE may be an oldest WQE relative to all WQEs of the WQEs ordered. To order the WQEs relative to one another, the work scheduler may be further configured to associate a portion of IUEs, of the plurality of IUEs, to create an ordering chain, wherein the portion of IUEs are occupied by respective WQEs that satisfy (a) and (b).

The work scheduler may be further configured to order, relative to one another, WQEs that (c) are associated with a respective tag-type value of ordered and a same respective tag value and (d) are from the plurality of WQEs associated with the given tag-space. To order the WQEs relative to one another, the work scheduler may be further configured to associate a portion of IUEs, of the plurality of IUEs, to create an ordering chain, wherein the portion of IUEs are occupied by respective WQEs that satisfy (c) and (d).

Work belonging to the at least one scheduling group may include a given WQE. The given WQE may belong to a first scheduling group of the at least one scheduling group assigned to the given tag-space. In an event the given WQE is scheduled for processing and associated with an ordering chain, the work scheduler may be further configured to detect a change in tag-space assignment in an event the given WQE is to be moved from the first scheduling group to a second scheduling group, wherein the second scheduling group is assigned to a different tag-space that is different from the given tag-space. The work scheduler may be further configured to perform at least one action based on the change detected.

The ordering chain may be a first ordering chain associated with the given-tag space. The at least one action may include removing an association between the given WQE and the first ordering chain and associating the given WQE with a second ordering chain. The second ordering chain may be associated with the different tag-space.

The at least one action may include triggering an error condition. Triggering the error condition may prevent the given WQE from being moved from the first scheduling group to the second scheduling group.

According to another example embodiment, a method for isolating work within a virtualized scheduler using tag-spaces. The method comprises assigning at least one scheduling group to a given tag-space. The given tag-space defines an ordering-atomicity domain for isolating, within the virtualized scheduler, (i) work belonging to the at least one scheduling group from (ii) work belonging to at least one other scheduling group, assigned to a respective tag-space different from the given tag-space. The method further comprises scheduling, for processing, work belonging to the at least one scheduling group and work belonging to the at least one other scheduling group, with independent ordering and atomicity effectuated therebetween by the ordering-atomicity domain.

Alternative method embodiments parallel those described above in connection with the example system embodiment.

According to another example embodiment, a virtualized scheduler comprises a tag-space resource configured to store at least one respective assignment of at least one scheduling group to a given tag-space. The given tag-space defines a given ordering-atomicity domain for isolating, within the virtualized scheduler, (i) work belonging to the at least one scheduling group from (ii) work belonging to at least one other scheduling group, assigned, in the tag-space resource to a respective tag-space different from the given tag-space. The virtualized scheduler further comprises a work scheduler configured to schedule, for processing, work belonging to the at least one scheduling group and work belonging to the at least one other scheduling group, with independent ordering and atomicity effectuated therebetween by the given ordering-atomicity domain.

According to yet another example embodiment, a network services processor comprises a plurality of processor cores and a virtualized scheduler. The virtualized scheduler includes a tag-space resource configured to store at least one respective assignment of at least one scheduling group to a given tag-space. The given tag-space defines a given ordering-atomicity domain for isolating, within the virtualized scheduler, (i) work belonging to the at least one scheduling group from (ii) work belonging to at least one other scheduling group, assigned, in the tag-space resource to a respective tag-space different from the given tag-space. The virtualized scheduler further comprises a work scheduler configured to schedule, for processing by a respective processor core of the plurality of processor cores or a respective thread executing on the respective processor core, work belonging to the at least one scheduling group and work belonging to the at least one other scheduling group.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
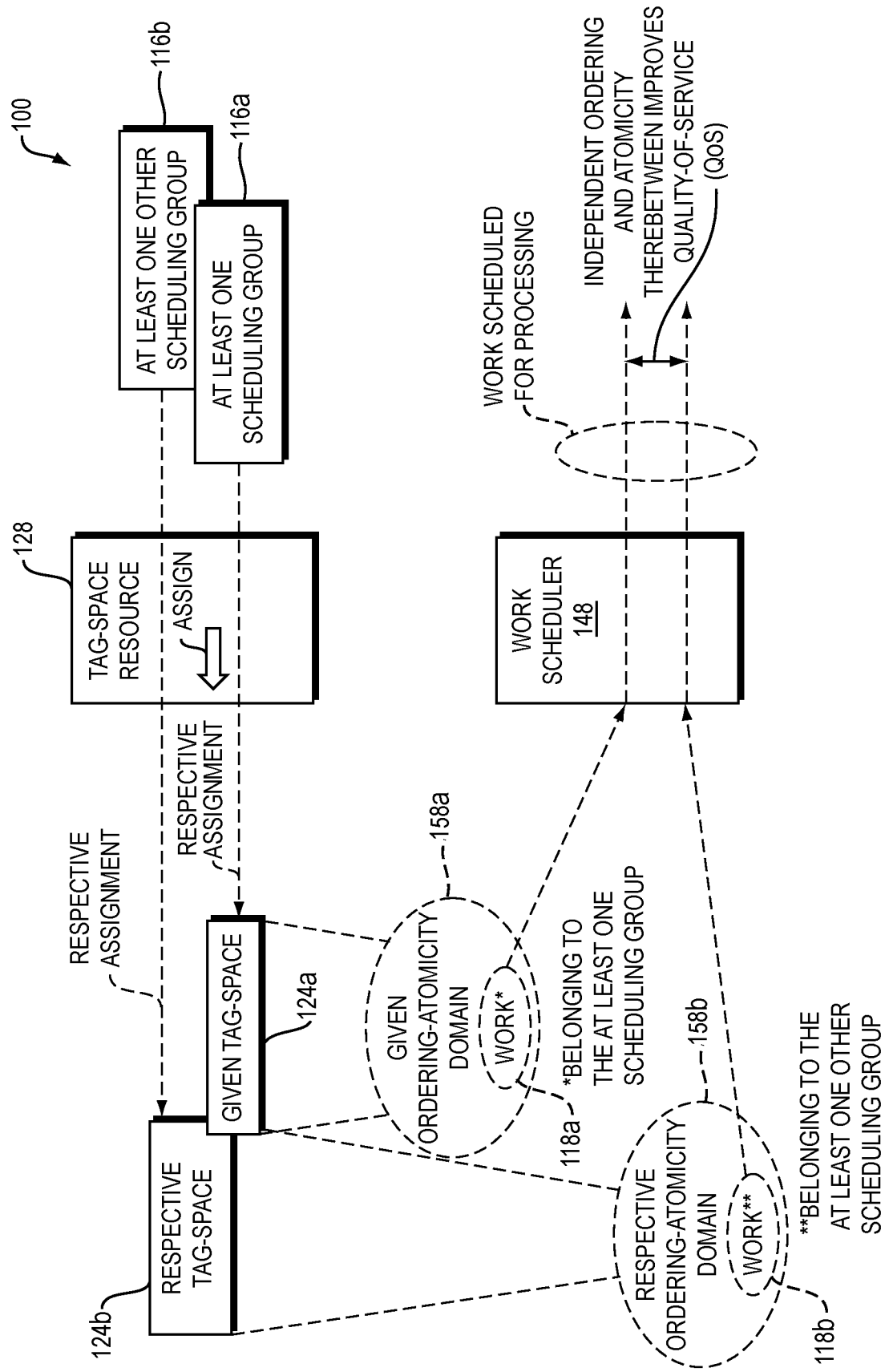
FIG. 1 is a block diagram of an example embodiment of a system for isolating work within a virtualized scheduler using tag-spaces.

A description of example embodiments follows.

Modern systems use virtualized schedulers, that is, schedulers that support hardware virtualization within which groups of pieces of work, for example, packet processing functions, can be assigned to different peripheral component interconnect express (PCIe) single root I/O virtualization (SR-IOV) physical functions (PFs) and virtual functions (VFs). Each physical function (PF) or virtual function (VF) may be assigned one or more work groups (also referred to interchangeably herein as scheduling groups) that include a respective collection of pieces of work to be performed.

Generally, "work" is a software routine or handler to be performed on some data, such as packet data. To the virtualized scheduler, work may be represented by an opaque pointer to memory, that is, a pointer which points to a data structure whose contents are not exposed at a time of its definition. Such a pointer may be created by a network interface unit (NIX), such as the NIX 671 of FIG. 6B, disclosed further below, or by software, and may be referred to herein as a work-queue pointer (WQP). The WQP, in combination with a group identifier, tag-type value, and tag value, may collectively form an entry, referred to herein as a work-queue entry (WQE), such as the WQE of FIG. 4, disclosed further below. The WQE may also be referred to interchangeably herein as a piece of work or work item.

Each piece of work (e.g., WQE) is assigned to a group (also referred to interchangeably herein as a scheduling group) and the group identifier in the WQE identifies the scheduling group to which the WQE belongs. The tag value associates the work with a work flow that corresponds to a packet flow (e.g., from a source to a destination), and the tag-type value specifies whether the work flow is un-ordered, ordered, or atomic.

If un-ordered (also referred to interchangeably herein as un-tagged), the tag value is not relevant and there is no requirement for order of work. Such a tag-type value may be used, for example, for work processing to be applied to different packet flows that have different tag values. For example, work processing for a given flow with a given tag value need not be ordered and synchronized relative to work processing for a different flow with a different tag value that is different relative to the given tag value. If un-ordered, work processing for the given flow can be executed in parallel with work processing for the different flow, by a different processor core(s) or thread(s).

If ordered, work ordering for work items of the ordered tag-type that have a same tag value is to be guaranteed; however, "atomicity," disclosed below, is not. Such a tag-type value may be used, for example, during a de-fragmentation phase of packet processing, so that fragments for a same packet flow are ordered. It should be understood, however, that the tag-type value of ordered is not limited to work processing during the de-fragmentation phase of packet processing.

If atomic, work ordering and atomicity are to be guaranteed. Atomicity not only requires that work items with a same tag value be processed in order, but also requires that earlier work, with the same tag value, finish before later work with that same tag value can begin. Such a tag-type value, that is, atomic, may be used, for example, for work related to Internet Protocol Security (IPsec) processing, to provide synchronization between work on packets that use a same IPSec tunnel. For example, work, such as IPSec decryption, may be carried out with a tag-type value of atomic. It should be understood, however, that the tag-type value of atomic is not limited to an IPsec work flow.

To enable ordering and atomicity of work, a scheduler may "organize" work in a chain. Such organization may be performed using metadata and the work being organized may occupy a same location in memory, prior to, and after, such organization. Such a chain may be referred to interchangeably herein as an "ordering" chain because the work items in the chain are ordered. Such ordering may be based on a first-in first-out (FIFO) order in which work items are ordered for processing in the order in which they are received. Further, work items in such a chain have a same tag value and, as such, the chain may also be referred to interchangeably herein as a "tag" chain or "tag-chain." Such an ordering chain may be a linked-list of work items or a doubly linked-list of work items. It should be understood, however, that the ordering chain may be any data structure in memory with associated metadata that enables work items in memory to be associated with a given order and is not limited to a linked-list or doubly-linked list data structure stored in memory.

An ordering chain may be one of two chain types, namely, ordered or atomic. An ordering chain of the ordered chain type includes work items wherein each work item has the ordered tag-type, whereas an ordering chain of the atomic chain type includes work items wherein each work item has the atomic tag-type. A single ordering chain may be created for each unique {tag-type value, tag value} pairing. Such chains may, however, limit performance (e.g., throughput) of a virtualized scheduler.

In a virtualized scheduler, scheduling groups, as well as workslots representing a processor core or thread for processing work of the scheduling groups, may be assigned to different PCI SR-IOV PFs and VFs. A feature that would be useful in a virtualized scheduler, is for work belonging to different PFs/VFs to belong to separate ordering chains, and separate atomicity domains, to improve performance of the virtualized scheduler. For example, if two different VFs have atomic work with a same tag value, enabling the virtualized scheduler to schedule both work items, in parallel, improves performance and, thereby, improves quality-of-service (QoS). Another feature that would be useful for scheduling within a virtualized scheduler is for work with a same tag value and a same tag-type value—but from different scheduling groups within the same PF/VF—to either all belong to a single ordering chain in some cases, or to belong to separate chains for each scheduling group in other cases. According to an example embodiment, a system isolates work in a virtualized scheduler using tag-spaces and, thereby, enables the above-noted features. Such a system is disclosed with regard to FIG. 1, further below.

According to an example embodiment, a tag-space defines a domain of ordering and atomicity, also referred to interchangeably herein as an ordering-atomicity domain. According to an example embodiment, all scheduling groups with a same tag-space value belong to a same ordering-atomicity domain, and all work in those scheduling groups belong to the same ordering-atomicity domain. Within an ordering-atomicity domain, each unique pairing of a {tag value, tag-type value} creates a single ordering chain. That is, all work within an ordering-atomicity domain with a unique {tag value, tag-type value} pairing belongs to a single ordering chain. Conversely, according to an example embodiment, work from different ordering-atomicity domains with the same {tag value, tag-type value} pairing belong to different ordering chains that are separate from one another.

The different ordering-atomicity domains created by different tag-spaces allows work from different groups to be isolated from each other. That is, work A from scheduling group X with tag-space 1 is isolated from work B from scheduling group Y with tag-space 2. Further, if both work A and work B have the same {tag value, tag-type value} pairing, because they have different tag-spaces, work A and B are not ordered with respect to each other, and the virtualized scheduler will not enforce atomicity between work A and B.

According to an example embodiment, software assigns tag-spaces when configuring a PF/VF, and/or when initializing a scheduling group. Tag-spaces are assigned in order to isolate different software entities. For example, scheduling groups used by different software entities may be assigned different tag-spaces in-order to isolate them from each other. Such isolation results in improved QoS by enabling parallel processing of work that would otherwise be prevented from being processed in parallel, absent tag-spaces defining different ordering-atomicity domains.

According to an example embodiment, scheduling groups belonging to different PFs/VFs may have different tag-spaces. Thus, the different virtual machines or software applications which use the different PFs/VFs will be isolated from each other. In some scenarios, it may be possible for different applications to share a single PF/VF, e.g., in an environment that leverages the PCIe Process Address Space ID (PASID) feature and para-virtualization.

PASID is an optional feature that enables sharing of a single endpoint device across multiple processes while providing each process a complete virtual address space. PASID is known in the art and is outside the scope of the present disclosure. Para-virtualization is a virtualization technique that presents a software interface to the virtual machines which is similar, yet not identical to the underlying hardware-software interface. Para-virtualization is known in the art and outside the scope of the present disclosure.

In such a scenario in which different applications share a single PF/VF, the scheduling groups within a single PF/VF may be allocated to different applications such that each application is using a different subset of the scheduling groups within the PF/VF. According to an example embodiment, each subset of the scheduling groups may use a different tag-space.

According to an example embodiment, a tag-space for a scheduling group is assigned before any software application adds work to that scheduling group. Such assignment may be performed at initial system boot time, or dynamically, as applications are run. Subsequently, some applications may terminate and other applications may start, and different tag-spaces may be assigned. As such, a given scheduling group may be re-assigned from a given tag-space to another tag-space. For example, different applications might result in software reassigning scheduling groups to different PFs/VFs and, thus, changing (i.e., reassigning) their tag-spaces. Further, different applications may result in a different usage of scheduling groups within a PF/VF, such that a given number of tag-spaces used within a single PF/VF may change. According to an example embodiment, a tag-space resource may be employed to configure assignments between N scheduling groups and M tag-spaces, on an N:1 basis, such as the tag-space resource 128 of the system 100 of FIG. 1, disclosed below.

FIG. 1 is a block diagram of an example embodiment of a system 100 for isolating work within a virtualized scheduler (not shown), such as the virtualized scheduler 102 of FIG. 2A or the Schedule/Sync and Order (SSO) module 602 (also referred to interchangeably herein as a virtualized scheduler) of FIG. 6A and FIG. 6B, disclosed further below. The system 100 isolates work, such as the work 118a and work 118b, using tag-spaces, such as a given tag-space 124a and respective tag-space 124b. The system 100 comprises the tag-space resource 128 that is configured to store at least one respective assignment (not shown) of at least one scheduling group 116a to the given tag-space 124a.

The tag-space resource 128 may be any type of memory/memories and may implement such assignment in any suitable way. For example, the tag-space resource 128 may include a look-up table (LUT) that maps scheduling group(s) to respective tag-space(s). It should be understood, however, that such assignment is not limited to being implemented via a LUT.

The given tag-space 124a defines an ordering-atomicity domain 158a for isolating, within the virtualized scheduler, (i) work 118a belonging to the at least one scheduling group 116a from (ii) work 118b belonging to at least one other scheduling group 116b. The at least one other scheduling group 116b is assigned, in the tag-space resource 128, to the respective tag-space 124b that is different from the given tag-space 124a.

The system 100 further comprises a work scheduler 148. The work scheduler 148 is configured to schedule, for processing, the work 118a belonging to the at least one scheduling group 116a, assigned to the given tag-space 124a, and the work 118b belonging to the at least one other scheduling group 116b, assigned to the respective tag-space 124b. Because the work 118a and work 118b belong to different scheduling groups that are assigned to different tag-spaces, they belong to different ordering-atomicity domains, namely the given ordering-atomicity domain 158a and respective ordering-atomicity domain 158b. As such, the work scheduler 148 can schedule the work 118a and work 118b with independent ordering and atomicity effectuated therebetween. For example, if both the work 118a and work 118b have the same {tag value, tag-type value} pairing, because they have different tag-spaces, work 118a and 118b are not ordered with respect to each other by the work scheduler 148, and the work scheduler 148 will not enforce atomicity between work the 118a and 118b.

The given ordering-atomicity domain 158a includes all work belonging to each scheduling group of the at least one scheduling group 116a assigned to the given tag-space 124a. The given ordering-atomicity domain 158a excludes all work belonging to all scheduling groups that are not assigned to the given tag-space 124a.

The respective tag-space 124b defines a respective ordering-atomicity domain 158b that is different from the given ordering-atomicity domain 158a. The respective ordering-atomicity domain 158b includes all work belonging to each scheduling group of the at least one other scheduling group 116b assigned to the respective tag-space 124b. The respective ordering-atomicity domain 158b excludes all work belonging to all scheduling groups that are not assigned to the respective tag-space 124b.

In an event the given ordering-atomicity domain 158a and respective ordering-atomicity domain 158b include respective work associated with a same tag value (not shown), the work scheduler 148 is enabled to schedule for processing, in parallel, by respective work processing entities (not shown), the respective work 118a from the given ordering-atomicity domain 158a and the respective work 118b from the respective ordering-atomicity domain 158b, irrespective of a respective tag value (not shown) or tag-type value (not shown) associated therewith.

The at least one scheduling group 116b may belong to a virtual machine (not shown), an application (not shown), or a physical function (PF) (not shown) or virtual function (VF) (not shown) associated with a single root I/O virtualization (SR-IOV) interface (not shown). The given tag-space 124a may be concealed from the virtual machine, application, or PF or VF, to which the at least one scheduling group 116a belongs. For example, while a tag value and/or tag type value, associated with work belonging to the at least one scheduling group 116a, may be reported by the virtualized scheduler to the virtual machine, application, or PF or VF, for example, following completion, such reporting may not include the given tag-space 124a.

The at least one other scheduling group 116b may belong to the virtual machine, application, or PF or VF to which the at least one scheduling group belongs. Alternatively, the at least one other scheduling group 116b may belong to a different virtual machine (not shown), different application (not shown), or different PF (not shown) or different VF (not shown), that is different from the virtual machine, application, or PF or VF to which the at least one scheduling group 116a belongs. The respective tag-space 124b may be concealed from the different virtual machine, different application, or different PF or different VF to which the at least one other scheduling group 116b belongs.

The at least one scheduling group 116a may be assigned to the given tag-space 124a before work is added to the at least one scheduling group 116a. In an event a given scheduling group (not shown), of the at least one scheduling group 116a, has no work belonging thereto, the given scheduling group may be permitted to be reassigned from the given tag-space 124a to another tag-space, such as the respective tag-space 124b, that is different from the given-tag space 124a. In an event the given scheduling group has work belonging thereto, the given scheduling group may not be permitted to be reassigned from the given tag-space 124a.

The system 100 may further comprise an in-unit entry (IUE) resource, arbiter, and tag-space controller, such as the IUE resource 112, arbiter 114, and tag-space controller 127, disclosed below with regard to FIG. 2A.

Figure 2A:
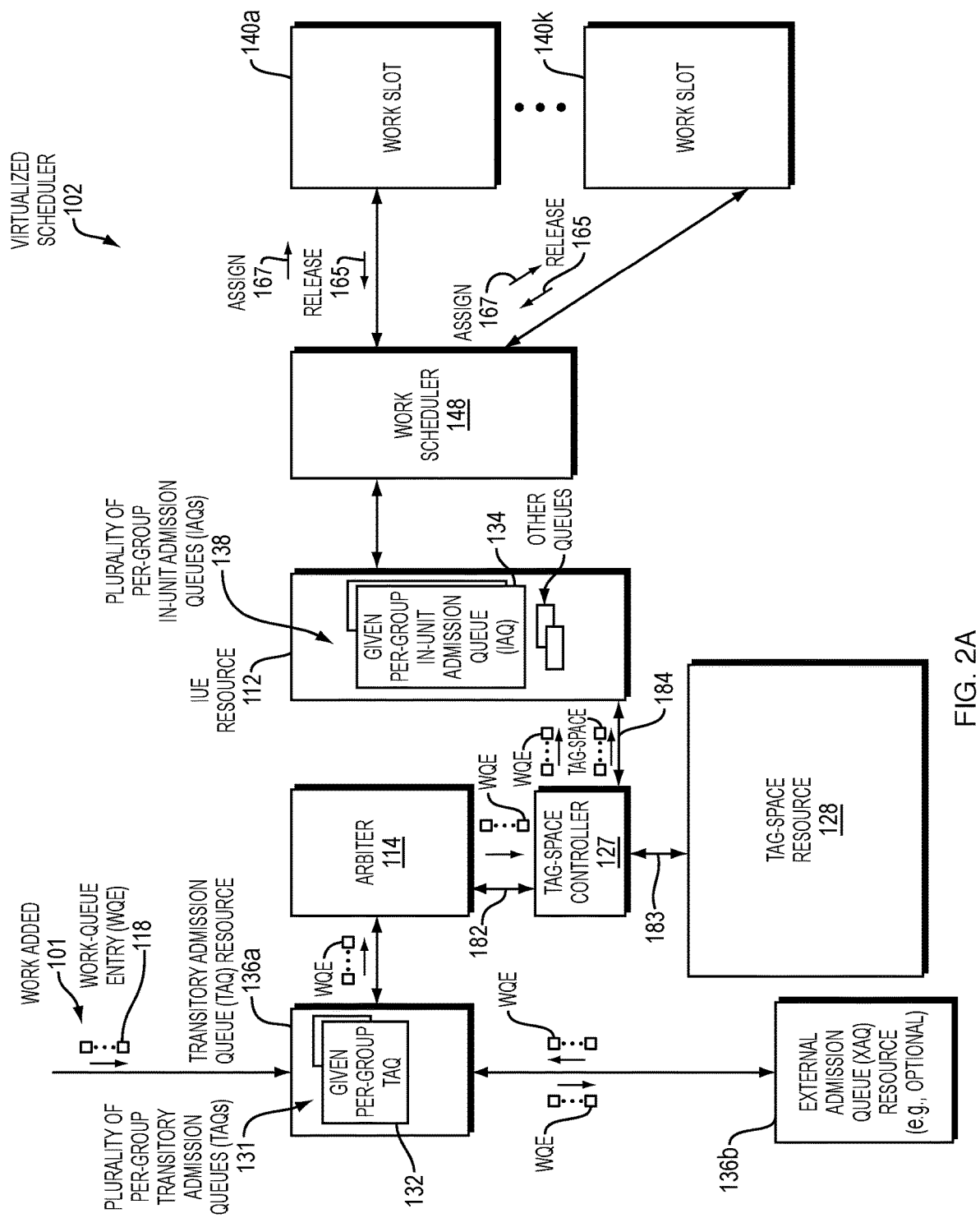
FIG. 2A is a block diagram of an example embodiment of a virtualized scheduler.

FIG. 2A is a block diagram of an example embodiment of a virtualized scheduler 102 that includes the system 100 of FIG. 1, disclosed above. According to an example embodiment, before work, such as the WQE 118, can be scheduled by the virtualized scheduler 102 for processing by, e.g., a processor core, processor thread, or other work processing entity assigned to a workslot, such as a given workslot of the plurality of workslots 140a-k, the WQE 118 needs to be moved into an in-unit entry (IUE) (not shown) of an IUE resource 112. The IUE resource and its corresponding in-unit entries (IUEs) are referred to herein as being "in-unit" because the IUE resource 112 and IUEs are included within the virtualized scheduler 102 that may be referred to as a scheduler "unit." Such IUEs may reside in on-chip memory of a chip, such as in a content-addressable memory (CAM), static random-access memory (SRAM), or other type of on-chip memory of a chip.

The chip may be a network services processor, such as the network services processor 650 of FIG. 6A, disclosed further below. The virtualized scheduler 102 may be the Schedule/Sync and Order (SSO) module 602 of the network services processor 650, disclosed further below. The work scheduler 148 may be configured to order work in the IUEs of the IUE resource 112 to schedule work to a workslot of the plurality of workslots 140a-k that is assigned to a processor core, such as a processor core of the processor cores 640a-k of FIG. 6A, processing thread, or other work processing entity. The work is identified by work-queue entries (WQEs) that occupy respective IUEs of the IUE resource 112 in order to be scheduled, for example, via assignment to a workslot by the work scheduler 148.

The work scheduler 148 selects work from the IUE resource 112 and assigns it to a workslot of the plurality of workslots 140a-k wherein the workslot may represent a thread or a CPU core which will process the work. When selecting work, the work scheduler 148 examines a given tuple of the {tag-space, tag-type value, and tag-type value} of the work, and compares the given tuple against the tuple {tag-space, tag-type value, tag value} of all "in-flight" work, that is, all work assigned to a workslot.

For atomic work, that is, work with the tag-type value set to atomic, the work scheduler 148 may only assign the work to a workslot if no other in-flight work has the exact same tuple {tag-space, tag-type value, tag value}. For ordered work, the work scheduler 148 may select the oldest in-flight work with the same tuple {tag-space, tag-type value, tag value} and add the newly assigned work to the end of an ordering chain of IUEs in the IUE resource 112, that is, the newly assigned work is now the youngest work in the ordering chain. According to an example embodiment, a "tail" bit in an IUE entry may be used to indicate that the IUE is occupied by work that is the youngest in the ordering chain.

Subsequent scheduler operations may move work from one ordering chain to another chain by changing its tag-space, tag value, or tag value. In such cases, the work scheduler 148 may wait until a work item is the oldest work in its ordering chain before moving it to the new chain. When changing the tag-type value to atomic, the work scheduler 148 may construct an ordering chain for the atomic work, but only the oldest work on the chain may be in-flight—younger work in the chain remains in a pending state until the older work completes or switches to a different ordering chain.

When a workslot completes a work item, the work scheduler 148 may remove the work item from the ordering chain by freeing an IUE in the IUE resource 112 that it occupies and, thus, remove the work item from the virtualized scheduler 102. The scheduler mechanisms of the work scheduler 148 disclosed above allow the virtualized scheduler 102 to allow parallel processing of work while providing mechanisms to synchronize and order work as necessary based on ordering-atomicity domains defined by respective tag-spaces assigned to scheduling groups.

According to an example embodiment, when work, such as the WQE 118, is added 101 to the virtualized scheduler 102, it enters an "admission queue" assigned to a group associated with the work. Each group has a dedicated admission queue (not shown) that is split between a transitory admission queue (TAQ) and an in-unit admission queue (IAQ), as disclosed below with regard to FIG. 2B.

Figure 2B:
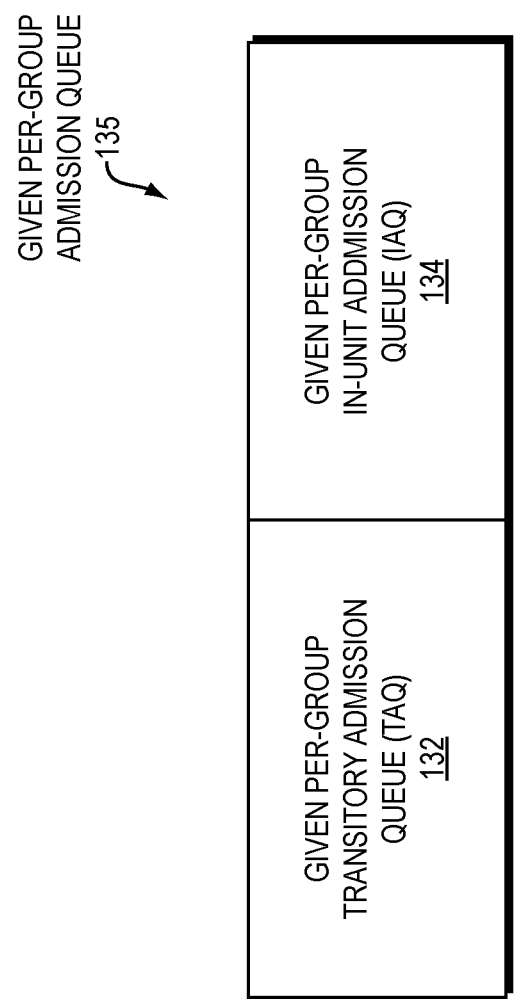
FIG. 2B is a block diagram of an example embodiment of an admission queue.

FIG. 2B is a block diagram of an example embodiment of a given per-group admission queue 135. The given per-group admission queue 135 is dedicated to a given scheduling group, such as a given scheduling group of the at least one scheduling group 116a or at least one other scheduling group 116b of FIG. 1, disclosed above, and is split between a given per-group TAQ 132 and given per-group IAQ 134, disclosed in more detail below with regard to FIG. 2A.

Referring back to FIG. 2A, the virtualized scheduler 102 includes a TAQ resource 136a that includes a plurality of per-group TAQs 131. The plurality of per-group TAQs 131 includes the given per-group TAQ 132 of the given per-group admission queue 135 of FIG. 2B, disclosed above. The virtualized scheduler 102 further includes the IUE resource 112 that includes a plurality of per-group in-unit admission queues (IAQs) 138. The plurality of per-group IAQs 138 includes the given per-group IAQ 134 of the given per-group admission queue 135 of FIG. 2B, disclosed above.

It should be understood that respective lengths of per-group TAQs of the plurality of per-group TAQs 131 may be dynamic. For example, a respective per-group TAQ may not exist until work for a respective scheduling group is added to the TAQ resource 136a and, thus, may have a respective length of zero. As WQEs, such as the WQE 118, are added 101 to the respective per-group TAQ, its length increases, and as WQEs are removed, its length decreases.

Similarly, each per-group IAQ of the plurality of per-group IAQs 138 may have a dynamic length and may not exist until work (i.e., WQE) for a respective scheduling group has been moved from the TAQ resource 136a into the IUE resource 112. For example, the given per-group IAQ 134 may not exist until a free IUE (not shown), from a plurality of IUEs (not shown) of the IUE resource 112, has been allocated for use as a given IUE configured to store a given WQE that is moved from the TAQ resource 136a into the TUE resource 112.

The virtualized scheduler 102 includes the arbiter 114 that arbitrates for when work can move from the TAQ resource 136a to the IUE resource 112. The arbiter 114 reads the details of the work item, such as details of the WQE 418 disclosed further below with regard to FIG. 4, from the TAQ resource 136a and may provide such details to a tag-resource controller 127, via an arbiter-to-tag-resource-controller bus 182, and the tag-resource controller 127 may write the details into the SRAM memories and other structures that may store state of the IUE resource 112. According to an example embodiment, the tag-space controller 127 may be included in the arbiter 114 and the arbiter 114 and tag-space resource 128 may, collectively, be referred to as the arbiter 114.

When moving work from the TAQ resource 136a to the IUE resource 112, the tag-space controller 127 may be configured to look up the tag-space assigned to the scheduling group to which the work belongs. For example, the tag-space controller 127 may retrieve the tag-space via a tag-space-controller-to-tag-space-resource bus 183 and provide this tag space along with the tag value, tag type value, WQP, group identifier, and any other details of the work to the IUE resource 112 via a tag-space-controller-to-IUE-resource bus 184. For example, a tag value of the work may be concatenated with the tag space for the scheduling group, and the tuple {tag value, tag space, tag-type value} may be stored in the IUE 112 structures (not shown) used to track work.

According to another example embodiment, the tag-space controller 127 may be separate from the arbiter 114 and may provide the tag-space back to the arbiter 114 via the arbiter-to-tag-resource-controller bus 182 in response to a request for same from the arbiter 114. Such request may include or accompany, for example, the WQE or a subset of data of the WQE, such as the group identifier. The arbiter 114 may, in turn, move the WQE in combination with the tag-space (e.g., write the details) to the IUE resource 112.

Subsequently, all internal operations of the virtualized scheduler 102 may use this tuple as the effective tag for the work, but when reporting the tag value to software, only the original tag may be reported (i.e., the tag-space may not visible to the VF driver software).

According to an example embodiment, work in the IUE resource 112, along with any in-flight work can use a CAM memory to store the {tag, tag-space, tag-type} tuple, along with an additional 'tail' bit to indicate the youngest work in a chain. When the work scheduler 148 selects a candidate piece of work, the work scheduler 148 may be configured to read the tuple from the CAM and compare it against all other CAM entries, that is, IUE entries in the IUE resource 112. In this case, only work with a same tag-space will match, and this will create independent ordering chains for each PF/VF. As such, in an event that firmware has assigned different tag-spaces for each scheduling group, this will create different ordering chains of IUEs for each scheduling group within a single PF/VF.

Further to selection of given WQE from the TAQ resource 136a by the arbiter 114, the tag-space controller 127 may associate a given IUE with a given scheduling group (not shown) to which the given WQE belongs and the given IUE transitions from a free state to an occupied state and represents an IAQ entry (not shown) of the given per-group IAQ 134 that is then dedicated to storing WQEs of the scheduling group. For example, as additional WQEs of the given scheduling group 116 are added to the IUE resource 122, they are configured to occupy respective free IUEs that are then appended to the given per-group IAQ 134. According to an example embodiment, the tag-space controller 127 obtains a tag-space assigned to the WQE by accessing the tag-space resource 128. The tag-space may be appended to the WQE, for example, by concatenating the tag-space to the tag value of the WQE. It should be understood that the tag-space may be moved in combination with the WQE into the TUE resource 112 in any suitable way and is not limited to being concatenated to the tag value of the WQE.

According to an example embodiment, the tag-space controller 127 may select the free IUA, to be occupied by a respective WQE, based on an IUE free list (not shown) that is maintained to identify free IUEs (not shown) in the IUE resource 112. The IUE free list may reside, for example, in the tag-space controller 127 and may be maintained by the tag-space controller 127. It should be understood, however, that the IUE free list is not limited to being located in the tag-space controller 127 or to being maintained by the tag-space controller 127. Maintaining the IUE free list may include changing an IUE free list pointer from pointing to the given IUE, that becomes occupied, to point to a next free TUE (not shown) in the IUE resource 112.

The next free IUE may or may not be adjacent to the given TUE in the TUE resource 112. As WQEs for the given scheduling group are moved from the TAQ resource 136a to the IUE resource 112, the given per-group IAQ 134 may increase in length as IUEs become occupied by those WQEs and are added to the given per-group IAQ 134. The tag-space controller 127 may add an IUE to the given per-group IAQ 134 by linking the IUE to another IUE of the given per-group IAQ 134 to form a queue that has an order, wherein such order tracks an admission order of admission to the IUE resource 112 of respective WQEs occupying same.

According to an example embodiment, the plurality of per-group TAQs 131 may be linked lists or doubly linked lists. Similarly, the plurality of per-group IAQs 138 may be linked-lists or doubly linked lists. According to an example embodiment, the plurality of per-group TAQs and per-group IAQs 138 may operate on a first-in first-out (FIFO) basis.

In general, work is moved from the TAQ resource 136a to the IUE resource 112 by the tag-space controller 127 and as work moves through the TAQ resource 136a and into the IUE resource 112, it remains ordered within each group. Initially, work is added 101 to the TAQ resource 136a. Such work may be generated and added 101, for example, by one or more of: the network interface unit (NIX) 671, cryptographic accelerator unit (CPT) 678, or timer unit 649 of FIG. 6B, disclosed further below, or a processor core, such as a processor core of the processor cores 640a-k of FIG. 6A and FIG. 6B, disclosed further below. It should be understood, however, that work may be generated and added 101 by other elements and is not limited to being generated and added by a processor core or the network interface unit (NIX) 671, cryptographic accelerator unit (CPT) 678, or timer unit 649 of FIG. 6B.

Continuing with reference to FIG. 2A, the TAQ resource 136a may reside in on-chip memory and may be extended in size based on an external admission queue (XAQ) resource 136b that resides, for example, in off-chip memory. According to an example embodiment, the on-chip memory may include SRAM and the off-chip memory may include dynamic-random access memory (DRAM), such as the DRAM 608 of FIG. 6A, disclosed further below. As more work is added 101 and the on-chip SRAM fills, the virtualized scheduler 102 moves work from the on-chip portion of the TAQ resource 136a into the off-chip memory of the XAQ resource 136b. The virtualized scheduler 102 can later bring that work back on-chip, that is, back into the TAQ resource 136a, in an event resources in the TAQ resource 136a become available.

Before work can be scheduled, it is moved from the given per-group TAQ 132 of the TAQ resource 136a and into a given per-group IAQ 134 of the TUE resource 112. The TUE resource 112 comprises a portion of the on-chip SRAM memories from which work can be scheduled to the workslots 140a-k. Each workslot of the workslots 140a-k represents state of respective work for completion by a respective work processing entity that is assigned to the workslot. The respective work processing entity may be a processor core, such as a given processor core of the plurality of processor cores 640a-k of FIG. 6A, disclosed further below. Alternatively, the work processing entity may be a given processor thread that is executing on the given processor core, wherein the given processor thread is assigned to the workslot. The respective work processing entity may request work, causing the work scheduler 148 to schedule work for the respective workslot assigned to the respective work processing entity.

Continuing with reference to FIG. 2A, the IUE resource 112 may further store data to track active work, that is, WQEs in the IUE resource 112, until it has been completed and released from the virtualized scheduler 102. The IUE 112 is a limited resource which is shared by all groups (also referred to interchangeably herein as scheduling groups or work groups).

WQEs occupying respective IUEs of the IUE resource 112 may be assigned to workslots by the work scheduler 148 of the virtualized scheduler 102, causing such WQEs to become "scheduled" for processing by a work processing entity assigned to the corresponding workslot. The work scheduler 148 may free the IUE in response to a release 165 indication received from a work processing entity (not shown) that is assigned to a given workslot that was assigned the work.

For example, the work scheduler 148 may assign 167 a given WQE to the given workslot and the work processing entity assigned to the given workslot may send the release 165 indication based on completion of the work represented by the given WQE. The work scheduler 148 may free the IUE by updating the free list, disclosed above, or by notifying the arbiter 114 that the IUE is to be freed, thereby causing the tag-space controller 127 to update the free list to indicate that the IUE is free for use. By occupying the given IUE, the given WQE 118 becomes available for scheduling by the work scheduler 148 of the virtualized scheduler 102.

In general, work flowing through the virtualized scheduler 102 is admitted to the IUE resource 112 by the arbiter 114 enabling the work to be in-flight (i.e., scheduled) and either "descheduled" or completed by a processor core, processor thread, or other work processing entity. Work scheduled to a given work processing entity may be descheduled by the given work processing entity in an event the given work processing entity is unable to complete the work at the time of scheduling. Such descheduled work may be re-scheduled at a later time in order to be completed by the given work processing entity or another work processing entity. Such descheduled work may be queued in a given per-group descheduled queue, such as disclosed below with regard to FIG. 3.

Figure 3:
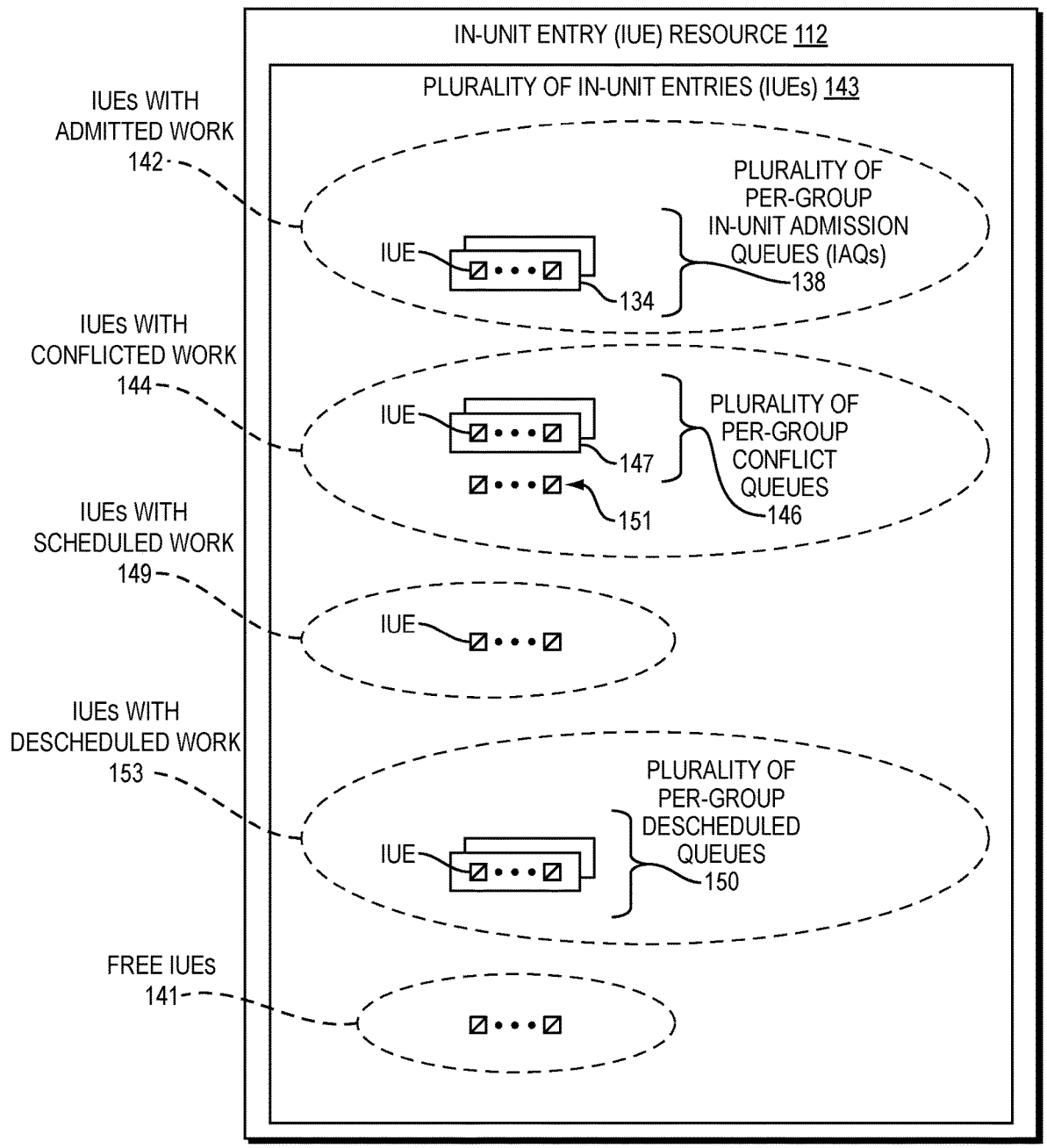
FIG. 3 is a block diagram of an example embodiment of an TUE resource.

FIG. 3 is a block diagram of an example embodiment of the TUE resource 112 of FIG. 2A, disclosed above. In the example embodiment, the plurality of IUEs 143 includes free IUEs 141. The free IUEs 141 are available for use by the tag-space controller 127, disclosed above with regard to FIG. 2A, for allocating to WQEs (not shown) that are to be admitted to the TUE resource 112. The plurality of IUEs 143 includes IUEs with admitted work 142. Such IUEs are occupied by respective WQEs (not shown) that were moved into (e.g., admitted) the TUE resource 112 by the tag-space controller 127. It should be understood that such WQEs occupy their respective IUEs until the work associated with such WQEs is completed or otherwise terminated, in which case the respective IUEs they occupy are subsequently freed for reuse.

The IUEs with admitted work 142 are configured to form the plurality of per-group IAQs 138 that include the given per-group IAQ 134. IUEs of a given per-group IAQ of the plurality of per-group IAQs 138, such as the given per-group IAQ 134, are occupied by respective WQEs of a unique given scheduling group that is identified by a respective group identifier included in the respective WQEs. The given per-group IAQ 134 of the plurality of per-group IAQs 138 may be formed by linking respective IUEs to the given per-group IAQ 134 in order to "add" them to the given per-group IAQ 134. For example, the given per-group IAQ may be a linked list or doubly linked list. It should be understood, however, that the plurality of per-group IAQs 138 are not limited to being linked lists or doubly linked lists.

Following admission of a given WQE to the IUE resource 143, the given WQE occupies a given IUE of a given per-group IAQ, such as the given per-group IAQ 134, and is available for scheduling by the work scheduler 148, disclosed above with regard to FIG. 2A. In an event the work scheduler 148 attempts to schedule the given WQE and the attempt fails, the work scheduler 148 may alter metadata (not shown) of its respective IUE, causing its respective IUE to be "moved" from the IUEs with admitted work 142 to the IUEs with conflicted work 144. It should be understood that the IUE is not physically "moved." Rather, the IUE is modified to designate that is occupied by a respective WQE that has conflict and to disassociate the IUE from given pre-group IAQ, thereby "removing" the IUE from the IUEs with admitted work 142.

As an TUE from the IUEs with conflicted work 144, the IUE may be a member of a given per-group conflict queue 147 of a plurality of per-group conflict queues 146. Alternatively, the IUE with conflicted work may be a non-queued TUE with conflicted work of a plurality of non-queued IUEs with conflicted work 151. Such a non-queued IUE with conflicted work may have to wait to be added to a per-group conflict queue.

In an event a conflict that is associated with a respective WQE, occupying a given IUE of the IUEs with conflicted work 144, is cleared, the work scheduler 148 may schedule the respective WQE by assigning it to a workslot and the given IUE may be "moved" to the IUEs with scheduled work 149. It should be understood that the given IUE is not physically moved and that the content thereof is not physically moved. The given IUE is, however, altered to indicate the assigned workslot for the respective WQE.

Similarly, in an event the work scheduler 148 schedules a given WQE occupying a respective IUE of the IUEs with admitted work 142, the work scheduler 148 assigns it to a workslot and alters metadata (not shown) of the respective IUE to indicate that the IUE is no longer linked to a given per-group IAQ of the plurality of per-group IAQs 138, thereby "moving" the respective IUE to the IUEs with scheduled work 149.

In an event a respective WQE, occupying a given IUE of the IUEs with scheduled work 149, is scheduled by the work scheduler 148, but work associated therewith cannot be completed by a work processing entity assigned to a given workslot that is assigned to the respective WQE, the work scheduler 148 may deschedule the respective WQE and the given TUE may be "moved" to the IUEs with descheduled work 153. It should be understood that the given IUE is not physically moved and that the content thereof is not physically moved. The given IUE may, however, be altered to indicate that the respective WQE occupying same has been descheduled. The given IUE may be linked to other IUEs of the IUEs with descheduled work 153 that are occupied by respective WQEs with a same group identifier as the respective WQE, thereby forming a per-group descheduled group 156 of the plurality of per-group descheduled queues 150.

Referring back to FIG. 2A, the IUE resource 112 includes a plurality of in-unit entries (IUEs), such as the plurality of IUEs 143 of FIG. 3, disclosed above, used for storing respective WQEs for scheduling by the work scheduler 148. The arbiter 114 may be configured to select WQEs to move into the TUE resource 112. The tag-space controller 127 may be configured to obtain, from the tag-space resource 128, respective tag-spaces assigned to respective scheduling groups of the WQEs selected and to move the WQEs selected, in combination with the respective tag-spaces obtained, into the IUE resource 112.

The WQEs selected may include respective group identifiers (IDs) of the respective scheduling groups, such as the group identifier 417 of the example embodiment of the WQE 418, disclosed further below with regard to FIG. 4. The tag-space controller 127 may be further configured to obtain the respective tag-spaces based on the respective group IDs.

The WQEs selected may include respective tag values, such as the tag value 464 of FIG. 4, disclosed further below. The tag-space controller 127 may be further configured to concatenate the respective tag values with the respective tag-spaces obtained.

The work scheduler 148 may be further configured to associate IUEs, of the plurality of IUEs, occupied by respective WQEs, associated with a same tag value, a same tag-type value, and a same tag-space value, to form a respective ordering chain (not shown) used by the work scheduler 148 to schedule the respective WQEs.

The work scheduler 148 may be further configured to create a respective single ordering chain (not shown), associated with the given tag-space 124a, for each unique pairing of a tag-type value and tag value found to be associated with work in the given ordering-atomicity domain 158a. The respective single ordering chain created may include and order all work in the given ordering-atomicity domain 158a that is associated with the unique pairing of the tag-type and tag values. In an event the tag-type value is un-ordered, the respective single ordering chain may not be created.

The work scheduler 148 may be further configured to create a different respective single ordering chain (not shown) for the unique pairing, in an event the unique pairing is found to be associated with work in the respective ordering-atomicity domain 158b. The different respective single ordering chain created may be associated with the respective tag-space 124b, that is different from the given tag-space 124a. The different respective single ordering chain created may include and order all work in the respective ordering-atomicity domain 158b that is associated with the unique pairing.

The work scheduler 148 may be further configured to create a first ordering chain (not shown), associated with the given tag-space 124a, for a given pairing of a tag-type value and tag value found to be associated with work in the given ordering-atomicity domain 158a. In an event the given pairing is found to be associated with work in the respective ordering-atomicity domain 158b, the work scheduler 148 may be further configured to create a second ordering chain (not shown), associated with the respective tag-space, for the given pairing, and to schedule work from the first and second ordering chains without enforcing order or atomicity therebetween.

Work belonging to the given ordering-atomicity domain 158a may include a plurality of work queue entries (WQEs) associated with the given tag-space 124a. The work scheduler 148 may be further configured to order and enforce atomicity of WQEs, of the plurality of WQEs, irrespective of work outside the given ordering-atomicity domain 158a.

The work scheduler 148 may be further configured to order and enforce atomicity of WQEs, of the plurality of WQEs associated with the given-tag-space 124a, selectively, based on respective tag-type values of the WQEs within the given ordering-atomicity domain 158a. For example, according to an example embodiment, the work scheduler 148 may be further configured to schedule WQEs, with a respective tag-type value of un-ordered, absent order or atomicity applied thereto.

To enforce atomicity, the work scheduler 148 may be further configured to order, relative to one another, WQEs that (a) are associated with a respective tag-type value of atomic and a same respective tag value and (b) are from the plurality of WQEs associated with the given-tag-space 124a, and to permit only a single work queue entry (WQE), from the WQEs ordered, to be processed at any time. The single WQE may be an oldest WQE relative to all WQEs of the WQEs ordered. To order the WQEs relative to one another, the work scheduler 148 may be further configured to associate a portion of IUEs, of the plurality of IUEs 143, to create an ordering chain, wherein the portion of IUEs are occupied by respective WQEs that satisfy (a) and (b).

The work scheduler 148 may be further configured to order, relative to one another, WQEs that (c) are associated with a respective tag-type value of ordered and a same respective tag value and (d) are from the plurality of WQEs associated with the given tag-space 124a. To order the WQEs relative to one another, the work scheduler 148 may be further configured to associate a portion of IUEs, of the plurality of IUEs, to create an ordering chain, wherein the portion of IUEs are occupied by respective WQEs that satisfy (c) and (d). A respective WQE may include a plurality of fields, such as disclosed further below with regard to FIG. 4.

According to an example embodiment, the virtualized scheduler 102 may change the scheduling group for a given WQE that is in-flight (i.e., scheduled). If the given WQE is un-ordered (i.e., un-tagged), the tag value is not relevant and there is no requirement for order of work. As such, the given WQE may change scheduling groups without constraint, regardless of whether or not the WQE is scheduled. The given WQE may, however, be of the ordered tag-type or atomic tag-type.

As such, the given WQE that is scheduled is associated with an ordering chain. For example, the given WQE may occupy a given IUE of the IUE resource 112 and the given IUE may be linked to other IUEs to form the ordering chain or the given IUE may create the ordering chain by being an initial member thereof to start the ordering chain. In an architecture that does not implement tag-spaces, changing the scheduling group would not require a change in ordering chains, even if the given WQE that is scheduled is associated with an ordering chain. In an implementation with tag-spaces, however, a change in scheduling group for the given WQE that is scheduled can require a change in ordering chains if the change in scheduling group changes tag-space.

For example, in an example embodiment that employs tag-spaces, an ordering chain is associated with a tuple of {tag-space, tag-type value, and tag-type value} and scheduling groups are assigned to respective tag-spaces. As such, if the given WQE is to be moved between scheduling groups with different tag-spaces, such a move would result in a change of ordering chains for the given WQE that is in-flight. An example embodiment detects when a change of scheduling group will change the tag-space, and may move the given WQE to a different ordering chain or generate an error condition based on same.

With reference to FIG. 1, according to an example embodiment, the given WQE (not shown) may belong to a first scheduling group (not shown) of the at least one scheduling group 116a assigned to the given tag-space 124a. In an event the given WQE is scheduled for processing and associated with an ordering chain (not shown), the work scheduler 148 may be further configured to detect a change in tag-space assignment in an event the given WQE is to be moved from the first scheduling group to a second scheduling group (not shown), wherein the second scheduling group is assigned to a different tag-space (not shown) that is different from the given tag-space 124a. The work scheduler 148 may be further configured to perform at least one action (not shown) based on the change detected.

For example, the ordering chain may be a first ordering chain associated with the given-tag space 124a. The at least one action may include removing an association between the given WQE and the first ordering chain and associating the given WQE with a second ordering chain. The second ordering chain may be associated with the different tag-space. Alternatively, the at least one action may include triggering an error condition (not shown). Triggering the error condition may prevent the given WQE from being moved from the first scheduling group to the second scheduling group.

As disclosed above, an example embodiment may trigger an error condition when a change of scheduling group would result in a change of tag-space. With reference to FIG. 2A, disclosed above, treating the change in tag-space as an error enables the virtualized scheduler 102 to enforce isolation between scheduling groups with different tag-spaces. For example, in the PASID use-case, disclosed above, different tag-spaces represent different applications using the same VF/PF. As such, treating the change in tag-space as an error enables the virtualized scheduler 102 to enforce isolation between applications using the same VF/PF. It may be useful, however, to allow the given WQE to change scheduling groups even though such change may require a change in ordering chains due to tag-space change. Allowing such a change may provide for efficient communication between different VFs/applications/VMs, etc.

Detecting the change in tag-space serves a practical use that allows some operations to allow the change and other operations to treat the change as an error and, optionally, prevent the change. For example, an operation, such as an update-group operation, in which changing the scheduling group changes tag-spaces without changing the tag value of the given WQE, may be implemented more efficiently by treating the change in tag-space as an error. Alternatively, if changing scheduling groups changes tag-spaces and the tag-value of the given WQE is changed as well, for example, as part of a "tag-switch" operation, the change in tag-spaces for the given WQE may be useful and, therefore, permitted. The tag value may be included as part of a structure of the given WQE, such as disclosed below with reference to FIG. 4.

Figure 4:
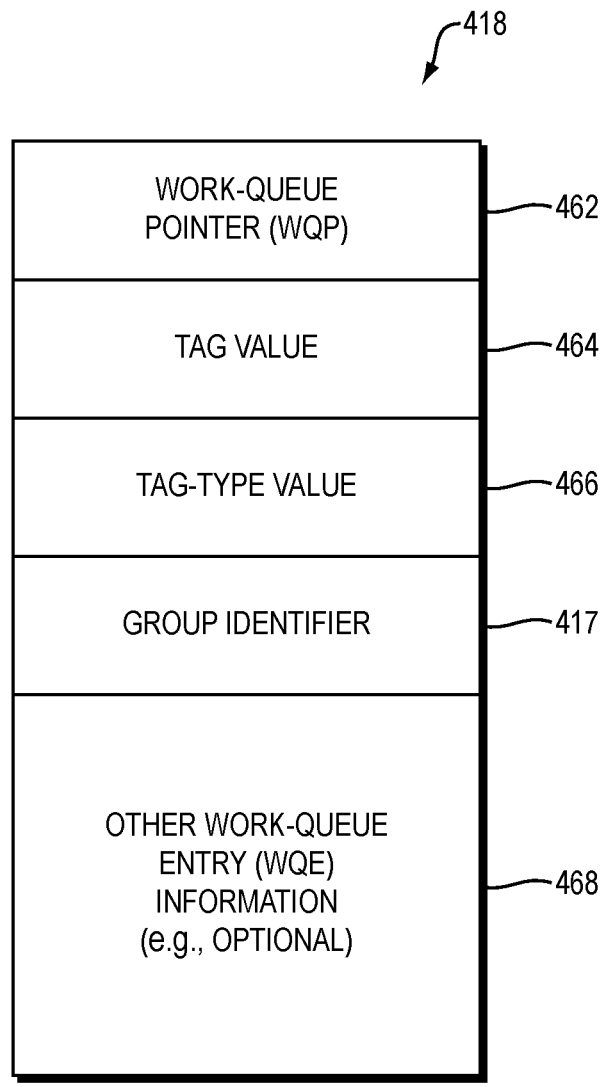
FIG. 4 is a block diagram of an example embodiment of a work-queue entry (WQE).

FIG. 4 is a block diagram of an example embodiment of a work-queue entry (WQE) 418. The WQE 418 includes an identifying pointer, that is, the WQE pointer (WQP) 462, a tag value 464, a tag-type value 466, and a group identifier 417. The WQE 418 may further include other WQE information 468.

The tag value 464 associates the WQE 418 with a unique work flow (not shown). The tag-type 466 specifies whether the unique work flow is ordered (ordering is guaranteed), atomic (ordering and atomicity are guaranteed), or un-ordered (no ordering is guaranteed). The group identifier 417 corresponds to the WQE 418 and is a unique identifier that identifies the scheduling group to which the WQE 418 is assigned. The other WQE information 468 may link the WQE 418 to other WQEs in the scheduling group. According to an example embodiment, the other WQE information 468 may include the corresponding tag-space that is assigned to the group identifier 417 in the tag-space resource 128, disclosed above with regard to FIG. 1 and FIG. 2A. According to another example embodiment, the tag value 464 may have the tag-space appended thereto. As such, the tag-type 466 specifies whether the unique work flow is ordered, atomic, or un-ordered within an ordering-atomicity domain defined by the tag-space, as disclosed above with regard to FIG. 1 and FIG. 2A.

Continuing with reference to FIG. 4, the tag value 464 allows the virtualized scheduler 102, disclosed above, to scheduler work for a same flow (from a source to a destination) to be ordered and synchronized within the ordering-atomicity domain. For example, the tag value 464 can be a hash of the standard Transmission Control Protocol (TCP) five-tuple, that is, Internet Protocol (IP) source address, IP destination address, IP protocol, TCP source port, TCP destination port in the header of a data packet defining a unique work "flow." The same flow has the same tag value, so it can be ordered and synchronized within the ordering-atomicity domain. Different flows likely have different tag values, so will not be ordered and synchronized, and can be executed completely in parallel on different processor cores. The tag type value 466 identifies the type of ordering and synchronization to be performed.

As all work is not equal, different WQEs may belong to different scheduling groups. Groups provide a means to execute different functions on different cores, even though all cores are shared by the virtualized scheduler 102. For example, packet processing can be pipelined from one group of cores to another group of cores, with the first group performing the first stage of the work and the next group performing the next stage of the work by defining the groups from which a processor core will accept work. Groups allow each processor core to specify the types of work it will accept, allowing the work scheduler 148 to dynamically distribute the work to available processor cores.

A processor core, such as any one of the processor cores disclosed below with regard to FIG. 6A, may request work from the work scheduler 148. Typically, the processor core polls the work scheduler 148 to find work. However, in some cases the work scheduler 148 can be selected to interrupt the processor core when it has work for the processor core. The work scheduler 148 selects, that is, schedules the work to the processor core based on the groups from which the processor core accepts work. The work scheduler 148 does not schedule a piece of work for a processor core if the processor core does not accept the group associated with the work, that is, if the processor core does not accept WQEs with the group identifier 417 of the group.

The WQP 462 may point to WQE data (not shown) that may be stored in memory of a network services processor, such as the network services processor 650 of FIG. 6A, disclosed further below. The work-queue data may be a packet descriptor that describes a packet received, for example, by the network interface unit (NIX) 671 of FIG. 6A. The packet descriptor may include information, such as an input port that a packet arrived on, number of bytes of the packet, pointer to the packet, other information based on data in fields of the packet, etc. It should be understood that the work-queue data is not limited to a packet descriptor and that the packet descriptor can include information in addition to and/or other than disclosed above.

As disclosed above, the tag type value 466 value may be atomic, ordered, or un-ordered. With reference to FIG. 4 and FIG. 2A, disclosed above, if the tag type value 466 is atomic, the work scheduler 148 will only allow one WQE with this tag type to be active at a time within the ordering-atomicity domain defined by the tag-space that corresponds to the group identifier 417. If the tag type value 466 is ordered, the work scheduler 148 can schedule multiple WQEs with the same tag value 464, but the work scheduler 148 maintains the ordering between those multiple packets and, in addition, the scheduler can "switch" the tag type value 466 to become atomic so that processors can determine the correct packet order. If the tag type value 466 is un-ordered, the work scheduler 148 does not track any ordering for the packets. This tag type value 466 may be determined, e.g., by the configuration of a given queue or port of the NIX 671 that receives the packets, to match (e.g., be consistent with) a behavior of software that will process the packets.

Work associated with different WQEs may be unrelated and can execute entirely in parallel on different cores when the WQEs have different tag values or tag types. WQEs associated with a same flow may have the same tag value 464, so they may be ordered and synchronized relative to other WQEs with the same tag-space. WQEs associated with different flows will likely have different tag values, so will likely not be ordered and synchronized, and can be executed completely in parallel on different processor cores, such as the processor cores 640a-k of FIG. 6A, disclosed further below. Such processor cores or threads executing thereon may be assigned work by a virtualized scheduler that may implement a method for isolating work, such as the method of FIG. 5, disclosed below.

Figure 5:
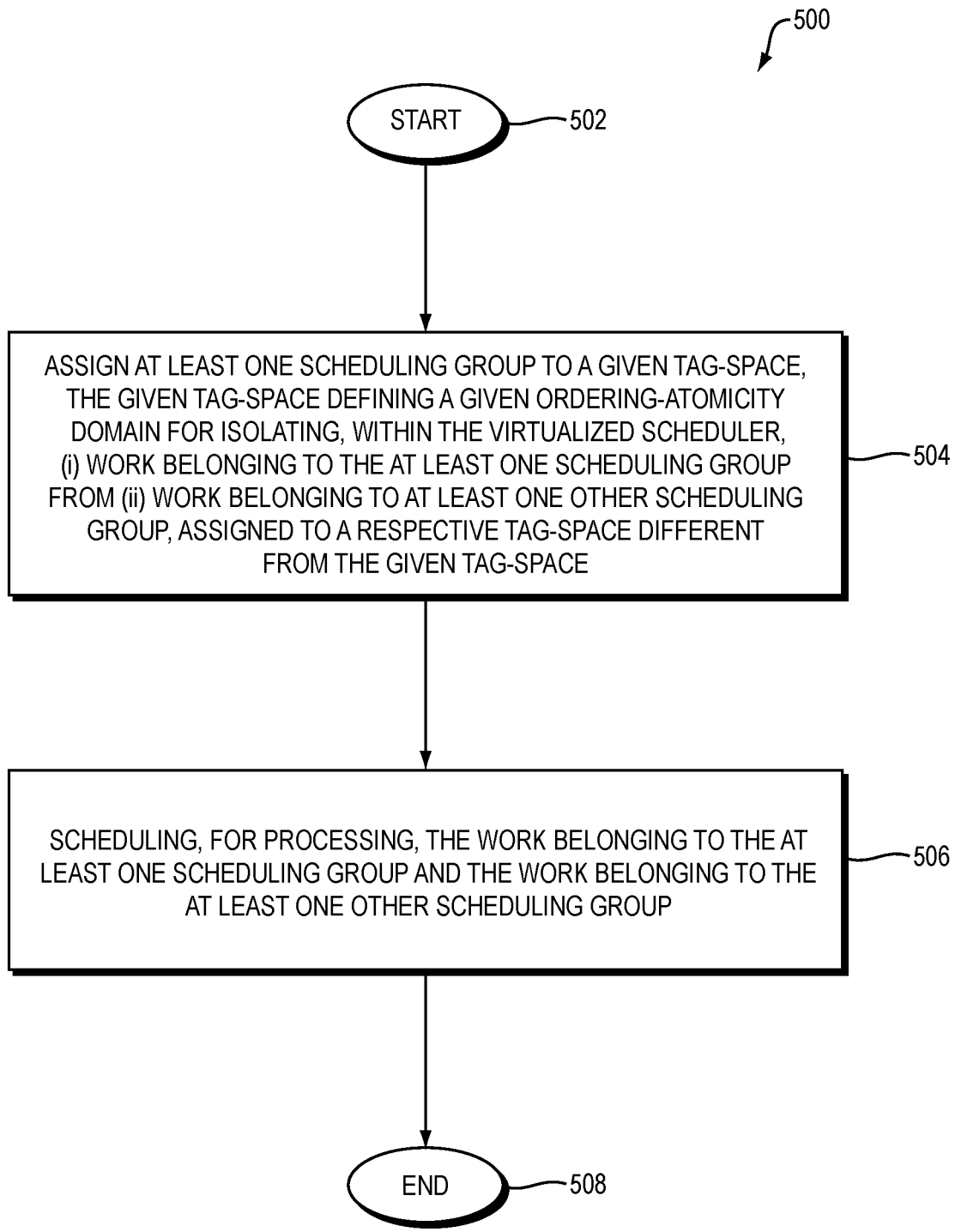
FIG. 5 is a flow diagram of an example embodiment of a method for isolating work within a virtualized scheduler using tag-spaces.

FIG. 5 is a flow diagram 400 of an example embodiment method for isolating work within a virtualized scheduler using tag-spaces. The method begins (502) and assigns at least one scheduling group to a given tag-space, the given tag-space defining a given ordering-atomicity domain for isolating, within the virtualized scheduler, (i) work belonging to the at least one scheduling group from (ii) work belonging to at least one other scheduling group, assigned to a respective tag-space different from the given tag-space (504). The method schedules, for processing, work belonging to the at least one scheduling group, assigned to the given tag-space, and work belonging to the at least one other scheduling group, assigned to the respective tag-space (506) and the method thereafter ends (508), in the example embodiment.

The method may schedule the work belonging to the at least one scheduling group, assigned to the given tag-space, and work belonging to the at least one other scheduling group, assigned to the respective tag-space, with independent ordering and atomicity effectuated therebetween by the given ordering-atomicity domain.

The method may further comprise including, in the given ordering-atomicity domain, all work belonging to each scheduling group of the at least one scheduling group assigned to the given tag-space, and excluding all work belonging to all scheduling groups that are not assigned to the given tag-space from the given ordering-atomicity domain.

The respective tag-space defines a respective ordering-atomicity domain different from the given ordering-atomicity domain. The method may further comprise including, in the respective ordering-atomicity domain, all work belonging to each scheduling group of the at least one other scheduling group assigned to the respective tag-space, and excluding, from the respective ordering-atomicity domain, all work belonging to all scheduling groups that are not assigned to the respective tag-space.

In an event the given and respective ordering-atomicity domains include respective work associated with a same tag value, the method may further comprise enabling the respective work from the given ordering-atomicity domain and the respective work from the respective ordering-atomicity domain, to be scheduled for processing, in parallel, by respective work processing entities, irrespective of a respective tag value or tag-type value associated therewith.

The method may further comprise concealing the given tag-space from the virtual machine, application, or PF or VF, that the at least one scheduling group belongs to. The at least one other scheduling group may belong to the virtual machine, application, or PF or VF that the at least one scheduling group belongs to. The method may further comprises concealing the respective tag-space from the virtual machine, application, or PF or VF.

The at least one other scheduling group may belong to a different virtual machine, different application, or different PF or different VF, that is different from the virtual machine, application, or PF or VF that the at least one scheduling group belongs to. The method may further comprise concealing the respective tag-space from the different virtual machine, different application, or different PF or different VF that the least one other scheduling group belongs to.

The method may further comprise assigning the at least one scheduling group to the given tag-space before adding work to the at least one scheduling group. In an event a given scheduling group, of the at least one scheduling group, has no work belonging thereto, the method may further comprise permitting the given scheduling group to be reassigned from the given tag-space to another tag-space that is different from the given-tag space. In an event the given scheduling group has work belonging thereto, the method may further comprise preventing the given scheduling group from being reassigned from the given tag-space.

The method may further comprise selecting work queue entries (WQEs) to move into an in-unit entry (IUE) resource, the IUE resource including a plurality of in-unit entries (IUEs) for storing respective WQEs for scheduling, obtaining respective tag-spaces assigned to respective scheduling groups of the WQEs selected, and moving the WQEs selected, in combination with the respective tag-spaces obtained, into the IUE resource.

The WQEs selected may include respective group identifiers (IDs) of the respective scheduling groups to which they belong and the method may further comprise obtaining the respective tag-spaces based on the respective group IDs.

The WQEs selected may include respective tag values and the method may further comprise concatenating the respective tag values with the respective tag-spaces obtained.

The method may further comprise associating IUEs, of the plurality of IUEs, occupied by respective WQEs, associated with a same tag value, a same tag-type value, and a same tag-space value, to form a respective ordering chain for scheduling the respective WQEs.

The method may further comprise creating a respective single ordering chain, associated with the given tag-space, for each unique pairing of a tag-type value and tag value found to be associated with work in the given ordering-atomicity domain. The respective single ordering chain created may include and order all work in the given ordering-atomicity domain that is associated with the unique pairing of the tag-type and tag values. In an event the tag-type value is un-ordered, the respective single ordering chain may not be created.

The method may further comprise creating a different respective single ordering chain for the unique pairing, in an event the unique pairing is found to be associated with work in the respective ordering-atomicity domain. The different respective single ordering chain created may be associated with the respective tag-space, different from the given tag-space, and may include and order all work in the respective ordering-atomicity domain that is associated with the unique pairing.

The method may further comprise creating a first ordering chain, associated with the given tag-space, for a given pairing of a tag-type value and tag value found to be associated with work in the given ordering-atomicity domain. In an event the given pairing is found to be associated with work in the respective ordering-atomicity domain, the method may further comprise creating a second ordering chain, associated with the respective tag-space, for the given pairing, and scheduling work from the first and second ordering chains without enforcing order or atomicity therebetween.

Work belonging to the given ordering-atomicity domain may include a plurality of WQEs associated with the given tag-space and the method may further comprise ordering and enforcing atomicity of WQEs, of the plurality of WQEs, irrespective of work outside the given ordering-atomicity domain. The ordering and enforcing of atomicity may be performed selectively, based on respective tag-type values of the WQEs within the given ordering-atomicity domain. The method may further comprise scheduling WQEs, with a respective tag-type value of un-ordered, absent order or atomicity applied thereto.

To enforce atomicity, the method may further comprise ordering, relative to one another, WQEs that (a) are associated with a respective tag-type value of atomic and a same respective tag value and (b) are from the plurality of WQEs associated with the given-tag-space, and permitting only a single work queue entry (WQE), from the WQEs ordered, to be processed at any time. The single WQE may be an oldest WQE relative to all WQEs of the WQEs ordered.

The ordering may include associating a portion of in-unit entries (IUEs), of a plurality of IUEs of an in-unit entry (IUE) resource, to create an ordering chain. The portion of IUEs are occupied by respective WQEs that satisfy (a) and (b).

The method may further comprise ordering, relative to one another, WQEs that (c) are associated with a respective tag-type value of ordered and a same respective tag value and (d) are from the plurality of WQEs associated with the given tag-space. The ordering may include associating a portion of IUEs, of the plurality of IUEs, to create an ordering chain. The portion of IUEs are occupied by respective WQEs that satisfy (c) and (d).

Work belonging to the at least one scheduling group may include a given WQE, the given WQE belonging to a first scheduling group of the at least one scheduling group assigned to the given tag-space. In an event the given WQE is scheduled for processing and associated with an ordering chain, the method may further comprise detecting a change in tag-space assignment in an event the given WQE is to be moved from the first scheduling group to a second scheduling group, wherein the second scheduling group is assigned to a different tag-space that is different from the given tag-space, and performing at least one action based on the change detected. The ordering chain may be a first ordering chain associated with the given-tag space. The at least one action may include removing an association between the given WQE and the first ordering chain and associating the given WQE with a second ordering chain, wherein the second ordering chain is associated with the different tag-space. The at least one action may include triggering an error condition. Triggering the error condition may prevent the given WQE from being moved from the first scheduling group to the second scheduling group.

The method of FIG. 5, disclosed above, is an example embodiment of method for isolating work within a virtualized scheduler using tag-spaces. Such a method may be implemented in the virtualized scheduler 102 of FIG. 2A, disclosed above, or the virtualized scheduler, referred to as the Schedule/Sync and Order (SSO) module 602, of the network services processor 650 of FIG. 6A, disclosed below.

Figure 6A:
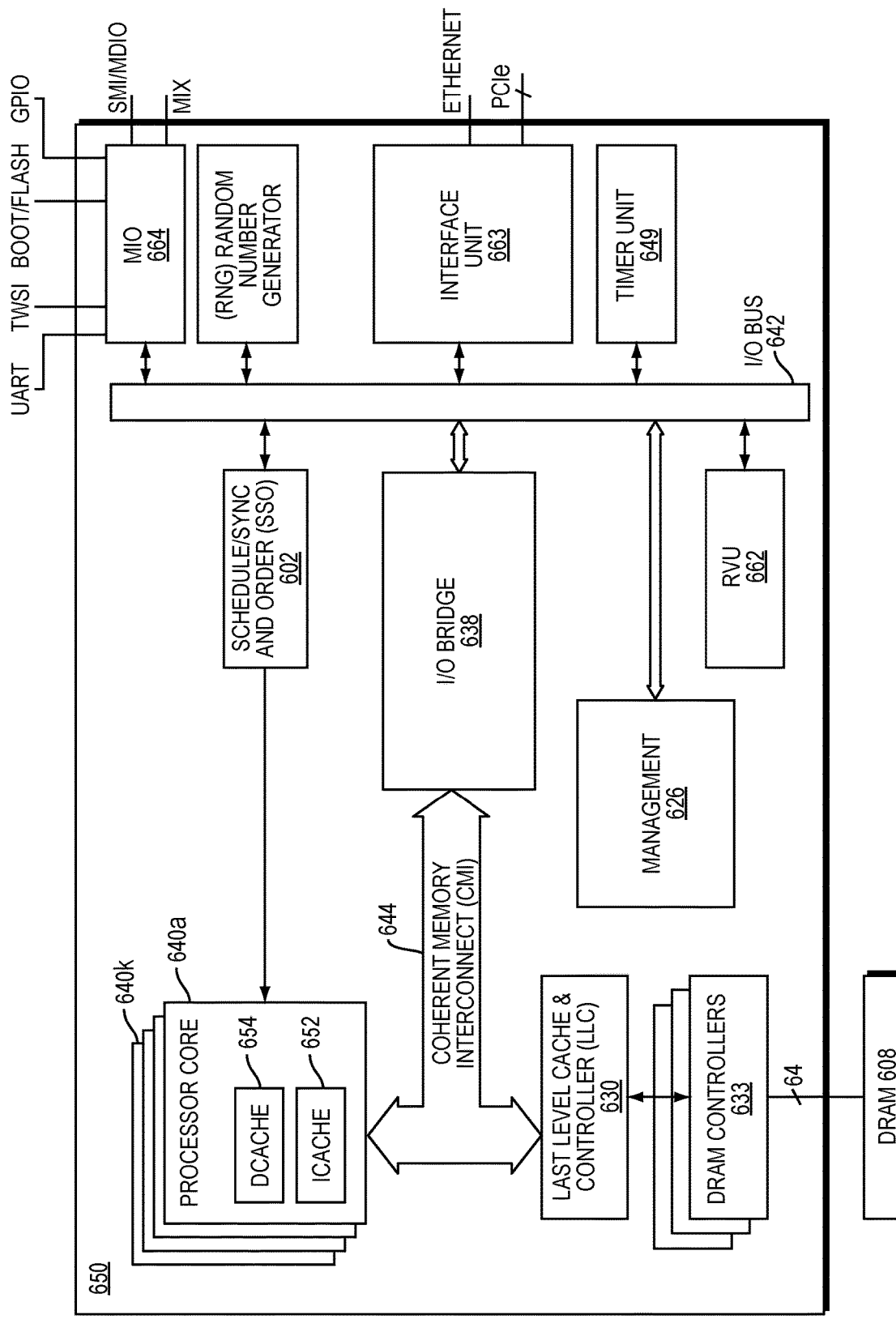
FIG. 6A is a block diagram of an example embodiment of a network services processor in which an example embodiment may be implemented.

FIG. 6A is a block diagram of an example embodiment of a network services processor 650 in which an example embodiment disclosed herein may be implemented. The network services processor 650 may process Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 650 may schedule and queue work (packet processing operations) for upper level network protocols, for example L4-L7, and allow processing of upper level network protocols in received packets to be performed to forward packets at wire-speed. The network services processor 650 may schedule and queue work for applications that may be restricted to lower layers, e.g., forwarding at L2 or L3 at wire-speed. Wire-speed is the rate of data transfer of the network over which data is transmitted and received. By processing the protocols to forward the packets at wire-speed, the network services processor 650 does not slow down the network data transfer rate.

A packet is received for processing by an interface unit 663. The interface unit 663 performs pre-processing of the received packet by checking various fields in the network protocol headers (e.g., L2, L3 and L4 headers) included in the received packet, and may perform checksum checks for TCP/User Datagram Protocol (UDP) (e.g., L4 transport protocols). The interface unit 663 may receive packets based on multiple network interface protocols, such as Ethernet and Peripheral Component Interconnect Express (PCIe). In a further embodiment, the interface unit 663 may be configured to receive packets from a plurality of X Attachment Unit Interfaces (XAUI), Reduced X Attachment Unit Interfaces (RXAUI), Serial Gigabit Media Independent Interfaces (SGMII), 40GBASE-R, 50GBASE-R, and/or 100GBASE-R. The interface unit 663 may also prepare and transmit outgoing packets based on one or more of the aforementioned interfaces.

The interface unit 663 may write packet data into buffers in the last level cache and controller (LLC) 630 or external DRAM 608. The packet data may be written into the buffers in a format convenient to higher-layer software executed in at least one processor core of the processor cores 640a-k. Thus, further processing of higher level network protocols is facilitated.

The network services processor 650 can also include one or more application specific co-processors. These co-processors, when included, offload some of the processing from the processor cores 640a-k, thereby enabling the network services processor 650 to achieve high-throughput packet processing.

An I/O bridge 638 is configured to manage the overall protocol and arbitration and provide coherent I/O portioning with an I/O Bus 642. The I/O bridge 638 may include buffer queues for storing information to be transferred between a coherent memory interconnect (CMI) 644, the I/O Bus 642, and the interface unit 663. The I/O bridge 638 may comprise a plurality of individual bridges on which communications and arbitration can be distributed.

The miscellaneous I/O interface (MIO) 664 can include auxiliary interfaces such as General Purpose I/O (GPIO), Flash, IEEE 802 two-wire Management Data I/O Interface (MDIO), Serial Management Interface (SMI), Universal Asynchronous Receiver-Transmitters (UARTs), two-wire serial interface (TWSI), and other serial interfaces.

A Schedule/Sync and Order (SSO) module 602 queues and schedules work for the processor cores 640a-k. According to an example embodiment, the SSO module 602 is the virtualized scheduler 102, disclosed above with regard to FIG. 2A. The network service processor 650 includes a timer unit 649 that may be used by the SSO module 602 to schedule work for the processor cores 640a-k.

The processor cores 640a-k may request work from the SSO module 648. The SSO module 602 selects (i.e., schedules) work for one of the processor cores 640a-k and returns a pointer to the work-queue entry describing the work to a given processor core of the processor cores 640a-k.

Each processor core includes an instruction cache 652 and Level-1 data cache 654. In one embodiment, the network services processor 650 includes 24 processor cores 640a-k. In some embodiments, each of the processor cores 640a-k may be an implementation of the Arm® architecture, such as the Armv8.2 64-bit architecture, and may be compatible with the Armv8.2 software ecosystem and include hardware floating point, single instruction multiple data (SIMD), and memory management unit (MMU) support. In such an embodiment, consistent with the Armv8.2 architecture, the processor cores 640a-k may contain full hardware support for virtualization. Guest operating systems can thus run at Arm defined user and operating system privilege levels, and hypervisor software can run in a separate higher privilege level. The processor cores 640a-k may also support a secure state in which software may run in three different privilege levels while hardware provides isolation from the non-secure state. It should be understood that a total number of the processor cores 640a-k is not limited to 24 and that an architecture of the processor cores 640a-k is not limited to a 64-bit architecture or to the Armv8.2 64-bit architecture.

Last level cache and controller (LLC) 630 and external DRAM 608 are shared by all of the processor cores 640a-k and I/O co-processor devices (not shown). Each processor core is coupled to the LLC 630 by the CMI 644. The CMI 644 is a communication channel for all memory and I/O transactions between the processor cores 640a-k, the I/O bridge 638 and the LLC 630. In one embodiment, the CMI 644 is scalable to multiple (e.g., 24) processor cores 640a-k, supporting fully-coherent Level-1 data caches 654 with write through. The CMI 644 may be highly-buffered with the ability to prioritize I/O.

The controller of the LLC 630 maintains memory reference coherence. It returns the latest copy of a block for every fill request, whether the block is stored in LLC 630, in external DRAM 608, or is "in-flight." A plurality of DRAM controllers 633 supports the external DRAM 608, and can support preferred protocols, such as the DDR4 protocol.

After a packet has been processed by the processor cores 640a-k, the interface unit 663 reads the packet data from the LLC 630, DRAM 608, performs L3 network protocol and L4 transport protocol post-processing (e.g., generates a TCP/UDP checksum), forwards the packet through the interface unit 663 and frees the LLC 630/DRAM 608 used by the packet. The DRAM Controllers 633 manage in-flight transactions (loads/stores) to/from the DRAM 608.

A resource virtualization unit (RVU) 662 may enable software to map various local function (LF) resources in various modules into several physical functions (PFs) and virtual functions (VFs). This enables multi-unit software drivers compatible with Linux®, Windows® and the data plane development kit (DPDK).

A management module 626 may include various units for managing operation of the network services processor 650. For example, the management module 626 may include a temperature sensor, a power serial bus master interface to determine current performance and energy consumption, and a memory diagnostic controller to detect and report memory errors. The management module 626 may further include control processors, such as a system control processor (not shown) for power management and other secure chip management tasks, and a module control processor (not shown) for module management and other non-secure chip management tasks.

Figure 6B:
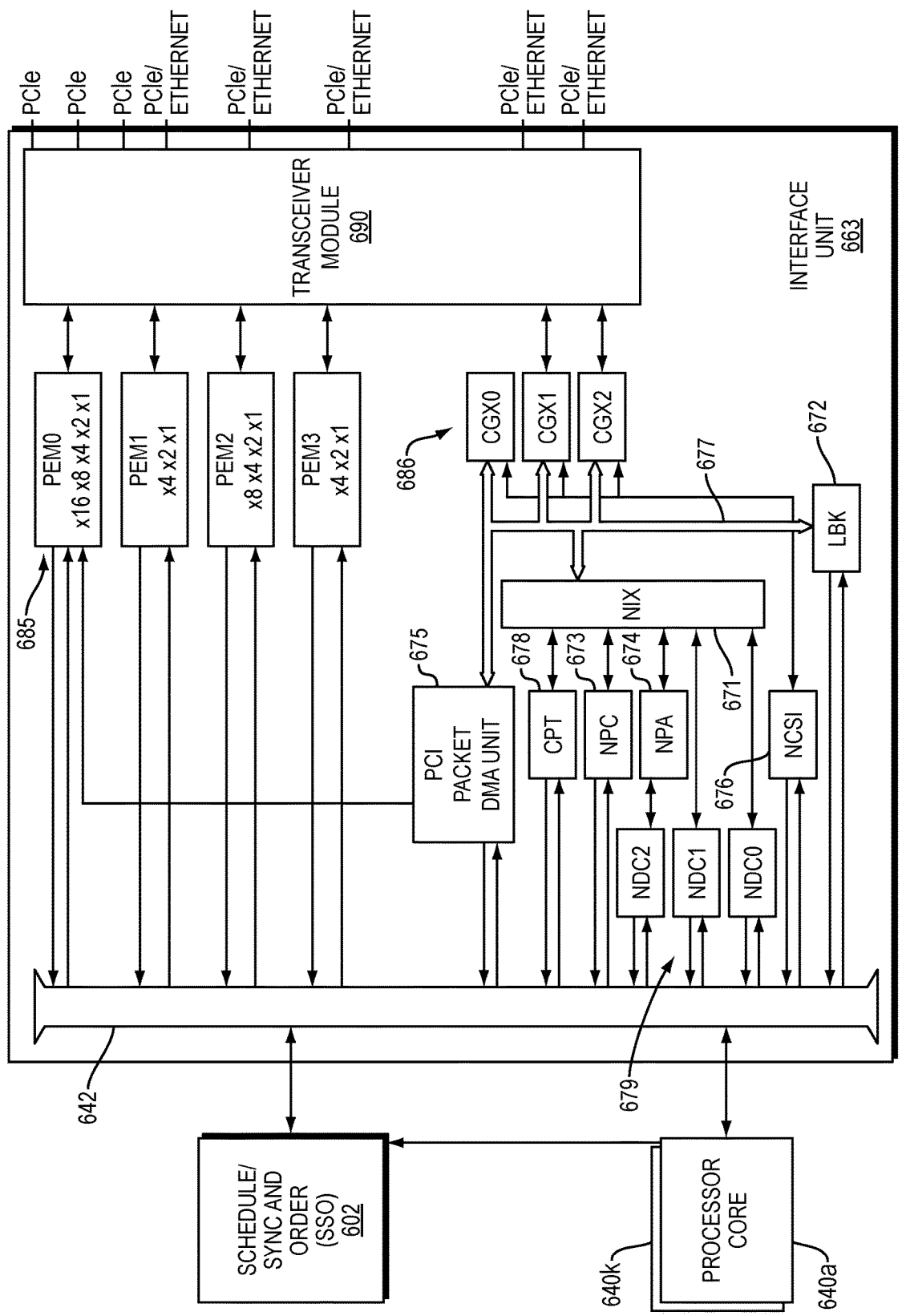
FIG. 6B is a block diagram of an example embodiment of an interface unit of the network services processor of FIG. 6A.

FIG. 6B is a block diagram of an example embodiment of the interface unit 663 of the network services processor 650 of FIG. 6A, disclosed above. Transceiver module 690 transmits and receives signals in accordance with one or more communications protocols, such as PCIe, Ethernet. Interface modules, including PCI Express interface units (PEM0-PEM3) 685, and Ethernet I/O controllers (CGX0-CGX2) 686 process received and outgoing signals in accordance with their respective protocols. A network controller sideband interface (NCSI) unit 676 provides an interface and protocol controller for a NCSI bus 677, which provides network packet data from/to the Ethernet I/O controllers (CGX0-CGX2) 686.

A network interface unit (NIX) 671 provides a controller (not shown) and direct memory access (DMA) engines (not shown) to process and move network packets (not shown). The NIX 671 transmits and receives packets to and from the aforementioned interfaces modules 685, and communicates with the SSO module 602 to schedule work for the processor cores 640a-k to further process the packets. The NIX 671 may also communicate with the processor cores 640a-k to forward work in lieu of the SSO module 602, and can receive packets from the processor cores 640a-k for transmission. The NIX 671 may include a transmit subunit (NIX-TX) (not shown) and a receive subunit (NIX-RX) (not shown), and a loopback module (LBK) 672 enables packets transmitted by the NIX-TX to be looped back and received by the NIX-RX.

The NIX 671 operates with a number of coprocessors. In particular, a network parser CAM unit (NPC) 673 parses network packets received for, or transmitted from, the NIX 671. A network pool allocator unit (NPA) 674 may allocate and free pointers for packet, work-queue entry, send descriptor buffers, and may support integration with a virtualization scheme. The SSO module 602, as described above, schedules work-queue entries for NIX packets. A cryptographic accelerator unit (CPT) 678 optionally decrypts Internet Protocol Security (IPsec) packets received by the NIX 671 and can encrypt data for outgoing packets. The interface unit 663 includes a PCI packet DMA unit 675 that may DMA packet data between the NIX 671, CGX0-CGX2, PEM0-PEM3 685, or LBK 672 and the LLC 630 or DRAM 608, disclosed above with regard to FIG. 6A. The interface unit 663 further includes a data cache (NDC0-NDC1) 679 that is a common data cache block for use by the NIX 671 and NPA 674.

While example embodiments have been particularly shown and described, it will be understood by those skilled in the art that various changes in form and details may be made therein without departing from the scope of the embodiments encompassed by the appended claims.

What is claimed is:

1. A system comprising:
   a tag-space resource configured to store at least one respective assignment of at least one scheduling group to a tag-space, the tag-space defining an ordering-atomicity domain for isolating (i) work belonging to the at least one scheduling group from (ii) work belonging to at least one other scheduling group, assigned, in the tag-space resource, to a respective tag-space different from the tag-space; and a work scheduler configured to schedule, for processing, work belonging to the at least one scheduling group and work belonging to the at least one other scheduling group, work from (i) and (ii) with a same {tag value, tag-type value} pairing belonging to different ordering chains, the different ordering chains used by the work scheduler to schedule (i) and (ii).

2. The system of claim 1, wherein:
the ordering-atomicity domain includes all work belonging to each scheduling group of the at least one scheduling group assigned to the tag-space; and
the ordering-atomicity domain excludes all work belonging to all scheduling groups that are not assigned to the tag-space.

3. The system of claim 1, wherein:
the respective tag-space defines a respective ordering-atomicity domain different from the ordering-atomicity domain;
the respective ordering-atomicity domain includes all work belonging to each scheduling group of the at least one other scheduling group assigned to the respective tag-space; and
the respective ordering-atomicity domain excludes all work belonging to all scheduling groups that are not assigned to the respective tag-space.

4. The system of claim 1, wherein:
the respective tag-space defines a respective ordering-atomicity domain different from the ordering-atomicity domain; and
in an event the ordering-atomicity domain and respective ordering-atomicity domain include respective work associated with a same tag value, the work scheduler is enabled to schedule for processing, in parallel, by respective work processing entities, the respective work from the ordering-atomicity domain and the respective work from the respective ordering-atomicity domain, irrespective of a respective tag value or tag-type value associated therewith.

5. The system of claim 1, wherein the at least one scheduling group belongs to a virtual machine, an application, or a physical function (PF) or virtual function (VF) associated with a single root I/O virtualization (SR-IOV) interface and wherein the tag-space is concealed from the virtual machine, application, or PF or VF, that the at least one scheduling group belongs to.

6. The system of claim 5, wherein the at least one other scheduling group belongs to the virtual machine, application, or PF or VF that the at least one scheduling group belongs to and wherein the respective tag-space is concealed from the virtual machine, application, or PF or VF.

7. The system of claim 5, wherein the at least one other scheduling group belongs to a different virtual machine, different application, or different PF or different VF, that is different from the virtual machine, application, or PF or VF that the at least one scheduling group belongs to, and wherein the respective tag-space is concealed from the different virtual machine, different application, or different PF or different VF.

8. The system of claim 1, wherein:
the at least one scheduling group is assigned to the tag-space before work is added to the at least one scheduling group;
in an event a scheduling group, of the at least one scheduling group, has no work belonging thereto, the scheduling group is permitted to be reassigned from the tag-space to another tag-space that is different from the tag-space; and
in an event the scheduling group has work belonging thereto, the scheduling group is not permitted to be reassigned from the tag-space.

9. The system of claim 1, wherein the system further comprises:
an in-unit entry (IUE) resource with a plurality of in-unit entries (IUEs) for storing respective work queue entries (WQEs) for scheduling by the work scheduler; an arbiter configured to select WQEs to move into the IUE resource; and
a tag-space controller configured to obtain, from the tag-space resource, respective tag-spaces assigned to respective scheduling groups of the WQEs selected and to move the WQEs selected, in combination with the respective tag-spaces obtained, into the IUE resource.

10. The system of claim 9, wherein:
the WQEs selected include respective group identifiers (IDs) of the respective scheduling groups; and
wherein the tag-space controller is further configured to obtain the respective tag-spaces based on the respective group IDs.

11. The system of claim 10, wherein the WQEs selected include respective tag values and wherein the tag-space controller is further configured to concatenate the respective tag values with the respective tag-spaces obtained.

12. The system of claim 9, wherein the work scheduler is further configured to associate IUEs, of the plurality of IUEs, occupied by respective WQEs, associated with a same tag value, a same tag-type value, and a same tag-space value, to form a respective ordering chain used by the work scheduler to schedule the respective WQEs.

13. The system of claim 1, wherein:
the work scheduler is further configured to create a respective single ordering chain, associated with the tag-space, for each unique pairing of a tag-type value and tag value found to be associated with work in the ordering-atomicity domain; and
the respective single ordering chain created includes and orders all work in the ordering-atomicity domain that is associated with the unique pairing of the tag-type and tag values.

14. The system of claim 13, wherein, in an event the tag-type value is un-ordered, the respective single ordering chain is not created.

15. The system of claim 13, wherein:
the respective tag-space defines a respective ordering-atomicity domain different from the ordering-atomicity domain;
the work scheduler is further configured to create a different respective single ordering chain for the unique pairing, in an event the unique pairing is found to be associated with work in the respective ordering-atomicity domain; and
the different respective single ordering chain created is associated with the respective tag-space, different from the tag-space, and includes and orders all work in the respective ordering-atomicity domain that is associated with the unique pairing.

16. The system of claim 1, wherein the respective tag-space defines a respective ordering-atomicity domain different from the ordering-atomicity domain and wherein the work scheduler is further configured to:
  create a first ordering chain, associated with the tag-space, for a pairing of a tag-type value and tag value found to be associated with work in the ordering-atomicity domain; and
  in an event the pairing is found to be associated with work in the respective ordering-atomicity domain, create a second ordering chain, associated with the respective tag-space, for the pairing, and schedule work from the first and second ordering chains without enforcing order or atomicity therebetween.

17. The system of claim 1, wherein:
  work belonging to the ordering-atomicity domain includes a plurality of WQEs associated with the tag-space; and
  the work scheduler is further configured to order and enforce atomicity of WQEs, of the plurality of WQEs, irrespective of work outside the ordering-atomicity domain.

18. The system of claim 17, wherein the work scheduler is further configured to order and enforce atomicity of WQEs, of the plurality of WQEs associated with the tag-space, selectively, based on respective tag-type values of the WQEs within the ordering-atomicity domain.

19. The system of claim 18, wherein the work scheduler is further configured to schedule WQEs, with a respective tag-type value of un-ordered, absent order or atomicity applied thereto.

20. The system of claim 18, wherein, to enforce atomicity, the work scheduler is further configured to:
  order, relative to one another, WQEs that (a) are associated with a respective tag-type value of atomic and a same respective tag value and (b) are from the plurality of WQEs associated with the tag-space; and
  permit only a single work queue entry (WQE), from the WQEs ordered, to be processed at any time, wherein the single WQE is an oldest WQE relative to all WQEs of the WQEs ordered.

21. The system of claim 20, further comprising an in-unit entry (IUE) resource with a plurality of in-unit entries (IUEs) for storing WQEs for scheduling and wherein, to order, the WQEs relative to one another, the work scheduler is further configured to associate a portion of IUEs, of the plurality of IUEs, to create an ordering chain, the portion of IUEs occupied by respective WQEs that satisfy (a) and (b).

22. The system of claim 18, wherein the work scheduler is further configured to order, relative to one another, WQEs that (c) are associated with a respective tag-type value of ordered and a same respective tag value and (d) are from the plurality of WQEs associated with the tag-space.

23. The system of claim 22, further comprising an in-unit entry (IUE) resource with a plurality of in-unit entries (IUEs) for storing respective WQEs for scheduling and wherein, to order the WQEs relative to one another, the work scheduler is further configured to associate a portion of IUEs, of the plurality of IUEs, to create an ordering chain, the portion of IUEs occupied by respective WQEs that satisfy (c) and (d).

24. The system of claim 1, wherein work belonging to the at least one scheduling group includes a WQE, the WQE belonging to a first scheduling group of the at least one scheduling group assigned to the tag-space, and wherein, in an event the WQE is scheduled for processing and associated with an ordering chain, the work scheduler is further configured to:
  detect a change in tag-space assignment in an event the WQE is to be moved from the first scheduling group to a second scheduling group, wherein the second scheduling group is assigned to a different tag-space that is different from the tag-space; and
  perform at least one action based on the change detected.

25. The system of claim 24, wherein the ordering chain is a first ordering chain associated with the tag-space and wherein the at least one action includes removing an association between the WQE and the first ordering chain and associating the WQE with a second ordering chain, the second ordering chain associated with the different tag-space.

26. The system of claim 24, wherein the at least one action includes triggering an error condition and wherein triggering the error condition prevents the WQE from being moved from the first scheduling group to the second scheduling group.

27. A method comprising:
  assigning at least one scheduling group to a tag-space, the tag-space defining an ordering-atomicity domain for isolating (i) work belonging to the at least one scheduling group from (ii) work belonging to at least one other scheduling group, assigned to a respective tag-space different from the tag-space; and
  scheduling, for processing, work belonging to the at least one scheduling group and work belonging to the at least one other scheduling group, work from (i) and (ii) with a same {tag value, tag-type value} pairing belonging to different ordering chains, the different ordering chains used to schedule (i) and (ii).

28. The method of claim 27, further comprising:
  including, in the ordering-atomicity domain, all work belonging to each scheduling group of the at least one scheduling group assigned to the tag-space; and
  excluding all work belonging to all scheduling groups that are not assigned to the tag-space from the ordering-atomicity domain.

29. The method of claim 27, wherein the respective tag-space defines a respective ordering-atomicity domain different from the ordering-atomicity domain and wherein the method further comprises:
  including, in the respective ordering-atomicity domain, all work belonging to each scheduling group of the at least one other scheduling group assigned to the respective tag-space; and
  excluding, from the respective ordering-atomicity domain, all work belonging to all scheduling groups that are not assigned to the respective tag-space.

30. The method of claim 27, wherein the respective tag-space defines a respective ordering-atomicity domain different from the ordering-atomicity domain and wherein, in an event the ordering-atomicity domain and respective ordering-atomicity domain include respective work associated with a same tag value, the method further comprises:
  enabling the respective work from the ordering-atomicity domain and the respective work from the respective ordering-atomicity domain, to be scheduled for processing, in parallel, by respective work processing entities, irrespective of a respective tag value or tag-type value associated therewith.

31. The method of claim 27, wherein the at least one scheduling group belongs to a virtual machine, an application, or a physical function (PF) or virtual function (VF)

associated with a single root I/O virtualization (SR-IOV) interface and wherein the method further comprises concealing the tag-space from the virtual machine, application, or PF or VF, that the at least one scheduling group belongs to.

32. The method of claim 31, wherein the at least one other scheduling group belongs to the virtual machine, application, or PF or VF that the at least one scheduling group belongs to and wherein the method further comprises concealing the respective tag-space from the virtual machine, application, or PF or VF.

33. The method of claim 31, wherein the at least one other scheduling group belongs to a different virtual machine, different application, or different PF or different VF, that is different from the virtual machine, application, or PF or VF that the at least one scheduling group belongs to, and wherein the method further comprises concealing the respective tag-space from the different virtual machine, different application, or different PF or different VF.

34. The method of claim 27, wherein the method further comprises:
   assigning the at least one scheduling group to the tag-space before adding work to the at least one scheduling group;
   in an event a scheduling group, of the at least one scheduling group, has no work belonging thereto, permitting the scheduling group to be reassigned from the tag-space to another tag-space that is different from the tag-space; and
   in an event the scheduling group has work belonging thereto, preventing the scheduling group from being reassigned from the tag-space.

35. The method of claim 27, wherein the method further comprises:
   selecting work queue entries (WQEs) to move into an in-unit entry (IUE) resource, the IUE resource including a plurality of in-unit entries (IUEs) for storing respective WQEs for scheduling; and
   obtaining respective tag-spaces assigned to respective scheduling groups of the WQEs selected; and
   moving the WQEs selected, in combination with the respective tag-spaces obtained, into the TUE resource.

36. The method of claim 35, wherein the WQEs selected include respective group identifiers (IDs) of the respective scheduling groups to which they belong and wherein the method further comprises obtaining the respective tag-spaces based on the respective group IDs.

37. The method of claim 36, wherein the WQEs selected include respective tag values and wherein the method further comprises concatenating the respective tag values with the respective tag-spaces obtained.

38. The method of claim 35, further comprising associating IUEs, of the plurality of IUEs, occupied by respective WQEs, associated with a same tag value, a same tag-type value, and a same tag-space value, to form a respective ordering chain for scheduling the respective WQEs.

39. The method of claim 27, further comprising creating a respective single ordering chain, associated with the tag-space, for each unique pairing of a tag-type value and tag value found to be associated with work in the ordering-atomicity domain, wherein the respective single ordering chain created includes and orders all work in the ordering-atomicity domain that is associated with the unique pairing of the tag-type and tag values.

40. The method of claim 39, wherein, in an event the tag-type value is un-ordered, the respective single ordering chain is not created.

41. The method of claim 39, wherein the respective tag-space defines a respective ordering-atomicity domain different from the ordering-atomicity domain and wherein the method further comprises:
   creating a different respective single ordering chain for the unique pairing, in an event the unique pairing is found to be associated with work in the respective ordering-atomicity domain, wherein the different respective single ordering chain created is associated with the respective tag-space, different from the tag-space, and includes and orders all work in the respective ordering-atomicity domain that is associated with the unique pairing.

42. The method of claim 27, wherein the respective tag-space defines a respective ordering-atomicity domain different from the ordering-atomicity domain and wherein the method further comprises:
   creating a first ordering chain, associated with the tag-space, for a pairing of a tag-type value and tag value found to be associated with work in the ordering-atomicity domain; and
   in an event the pairing is found to be associated with work in the respective ordering-atomicity domain, creating a second ordering chain, associated with the respective tag-space, for the pairing, and scheduling work from the first and second ordering chains without enforcing order or atomicity therebetween.

43. The method of claim 27, wherein work belonging to the ordering-atomicity domain includes a plurality of WQEs associated with the tag-space and wherein the method further comprises ordering and enforcing atomicity of WQEs, of the plurality of WQEs, irrespective of work outside the ordering-atomicity domain.

44. The method of claim 43, wherein the ordering and enforcing of atomicity is performed selectively, based on respective tag-type values of the WQEs within the ordering-atomicity domain.

45. The method of claim 44, further comprising scheduling WQEs, with a respective tag-type value of un-ordered, absent order or atomicity applied thereto.

46. The method of claim 44, wherein, to enforce atomicity, the method further comprises:
   ordering, relative to one another, WQEs that (a) are associated with a respective tag-type value of atomic and a same respective tag value and (b) are from the plurality of WQEs associated with the tag-space; and
   permitting only a single work queue entry (WQE), from the WQEs ordered, to be processed at any time, wherein the single WQE is an oldest WQE relative to all WQEs of the WQEs ordered.

47. The method of claim 46, wherein the ordering includes associating a portion of in-unit entries (IUEs), of a plurality of IUEs of an in-unit entry (IUE) resource, to create an ordering chain, and wherein the portion of IUEs are occupied by respective WQEs that satisfy (a) and (b).

48. The method of claim 44, wherein the method further comprises ordering, relative to one another, WQEs that (c) are associated with a respective tag-type value of ordered and a same respective tag value and (d) are from the plurality of WQEs associated with the tag-space.

49. The method of claim 48, wherein the ordering includes associating a portion of IUEs, of the plurality of IUEs, to create an ordering chain, and wherein the portion of IUEs are occupied by respective WQEs that satisfy (c) and (d).

50. The method of claim 27, wherein work belonging to the at least one scheduling group includes a WQE, the WQE belonging to a first scheduling group of the at least one scheduling group assigned to the tag-space, and wherein, in an event the WQE is scheduled for processing and associated with an ordering chain, the method further comprises:

detecting a change in tag-space assignment in an event the WQE is to be moved from the first scheduling group to a second scheduling group, wherein the second scheduling group is assigned to a different tag-space that is different from the tag-space; and performing at least one action based on the change detected.

51. The method of claim 50, wherein the ordering chain is a first ordering chain associated with the tag-space and wherein the at least one action includes:

removing an association between the WQE and the first ordering chain; and associating the WQE with a second ordering chain, the second ordering chain associated with the different tag-space.

52. The method of claim 51, wherein the at least one action includes triggering an error condition and wherein triggering the error condition prevents the WQE from being moved from the first scheduling group to the second scheduling group.

53. A system comprising:

a tag-space resource configured to store at least one respective assignment of at least one scheduling group to a tag-space, the tag-space defining an ordering-atomicity domain for isolating (i) work belonging to the at least one scheduling group from (ii) work belonging to at least one other scheduling group, assigned, in the tag-space resource, to a respective tag-space different from the tag-space; and a work scheduler configured to schedule, for processing, work belonging to the at least one scheduling group and work belonging to the at least one other scheduling group, the at least one scheduling group associated with a virtual machine, an application, or a physical function (PF) or virtual function (VF), the tag-space concealed from the virtual machine, application, or PF or VF, that the at least one scheduling group belongs to.

54. A method comprising:

assigning at least one scheduling group to a tag-space, the tag-space defining an ordering-atomicity domain for isolating (i) work belonging to the at least one scheduling group from (ii) work belonging to at least one other scheduling group, assigned to a respective tag-space different from the tag-space; and scheduling, for processing, work belonging to the at least one scheduling group and work belonging to the at least one other scheduling group, the at least one scheduling group associated with a virtual machine, an application, or a physical function (PF) or virtual function (VF), the method further comprising concealing the tag-space from the virtual machine, application, or PF or VF, that the at least one scheduling group belongs to.

\* \* \* \* \*

UNITED STATES PATENT AND TRADEMARK OFFICE
CERTIFICATE OF CORRECTION

| | | |
|---|---|---|
| PATENT NO. | : 12,039,359 B1 | |
| APPLICATION NO. | : 17/809861 | |
| DATED | : July 16, 2024 | |
| INVENTOR(S) | : Jason D. Zebchuk et al. | |

It is certified that error appears in the above-identified patent and that said Letters Patent is hereby corrected as shown below:

On the Title Page

In Item (56), under "OTHER PUBLICATIONS", in Column 2, Line 1, delete "1/0" and insert --I/O--

In the Drawings

In Fig. 2B, Sheet 3 of 8, for Tag "134", Line 2, delete "ADDMISSION" and insert --ADMISSION--

In the Specification

In Column 3, Line 15, delete "TUE" and insert --IUE--

In Column 5, Line 62, delete "TUE" and insert --IUE--

In Column 12, Line 30, delete "TUE" and insert --IUE--

In Column 13, Line 5, delete "visible" and insert --be visible--

In Column 13, Line 37, delete "TUE" and insert --IUE--

In Column 13, Line 51, delete "TUE" and insert --IUE--

In Column 13, Line 53, delete "TUE in the TUE" and insert --IUE in the IUE--

In Column 14, Line 36, delete "TUE resource 112. The TUE" and insert --IUE resource 112. The IUE--

In Column 15, Line 27, delete "TUE" and insert --IUE--

In Column 15, Line 32, delete "TUE" and insert --IUE--

Signed and Sealed this
Twenty-fifth Day of March, 2025

Coke Morgan Stewart
*Acting Director of the United States Patent and Trademark Office*

CERTIFICATE OF CORRECTION (continued)
U.S. Pat. No. 12,039,359 B1

In Column 15, Line 35, delete "TUE" and insert --IUE--

In Column 16, Line 2, delete "pre-group" and insert --per-group--

In Column 16, Line 4, delete "TUE" and insert --IUE--

In Column 16, Line 8, delete "TUE" and insert --IUE--

In Column 16, Line 36, delete "TUE" and insert --IUE--

In Column 16, Line 51, delete "TUE" and insert --IUE--

In Column 22, Line 20, delete "TUE" and insert --IUE--

In the Claims

In Column 31, Line 42, in Claim 35, delete "TUE" and insert --IUE--